United States Patent
Lu et al.

(10) Patent No.: US 9,154,404 B2
(45) Date of Patent: Oct. 6, 2015

(54) METHOD AND SYSTEM OF ACCESSING NETWORK FOR ACCESS NETWORK DEVICE

(75) Inventors: Dorian Lu, Shanghai (CN); Carl Yang, Beijing (CN)

(73) Assignee: Beijing Qiantang Network Technology Company, LTD., Beijing (CN)

( * ) Notice: Subject to any disclaimer, the term of this patent is extended or adjusted under 35 U.S.C. 154(b) by 311 days.

(21) Appl. No.: 13/814,728

(22) PCT Filed: Aug. 4, 2011

(86) PCT No.: PCT/CN2011/077991
§ 371 (c)(1),
(2), (4) Date: Apr. 18, 2013

(87) PCT Pub. No.: WO2012/016531
PCT Pub. Date: Feb. 9, 2012

(65) Prior Publication Data
US 2013/0201990 A1    Aug. 8, 2013

(30) Foreign Application Priority Data
Aug. 6, 2010  (CN) .......................... 2010 1 0248237

(51) Int. Cl.
*H04L 12/56*      (2006.01)
*H04L 12/721*     (2013.01)
*H04L 12/28*      (2006.01)

(52) U.S. Cl.
CPC ............ *H04L 45/14* (2013.01); *H04L 12/2856* (2013.01); *H04L 12/2869* (2013.01)

(58) Field of Classification Search
None
See application file for complete search history.

(56) References Cited

U.S. PATENT DOCUMENTS 5,425,026 A * 6/1995 Mori .............................. 370/410
5,909,430 A * 6/1999 Reaves .......................... 370/254
(Continued)

FOREIGN PATENT DOCUMENTS

CN    101252587 A    8/2008
CN    101547194      9/2009
(Continued)

OTHER PUBLICATIONS

First Office Action for Chinese App. No. 201010247237.3 dated Aug. 23, 2013, along with English Translation of Text of Office Action, 6 pages.
(Continued)

*Primary Examiner* — Steve Young
(74) *Attorney, Agent, or Firm* — Foley & Lardner LLP

(57) ABSTRACT

A method for an access network device to access a network is disclosed, which comprises: powering on an access switch, and setting in its internal downlink protocol packet address table that all downlink protocol packets are to be oriented to a CPU module; receiving, by the access switch, a downlink protocol packet sent from a node server and orienting the downlink protocol packet to the CPU module of the access switch, and generating, by the CPU module, an uplink protocol packet and sending the uplink protocol packet to the node server, wherein the downlink protocol packet contains an access network address that is to be allocated; sending, by the node server, a network access command to the access switch, wherein the network access command contains an access network address of the access switch, and the access network address is the access network address to be allocated; and updating, by the access switch, its internal downlink protocol packet address table, as orienting only a protocol packet with a destination address being its own access network address to the CPU module. The present invention can guarantee a stable transmission rate of the data packet transmission and avoid time delay, thereby guaranteeing the quality of the network transmission.

14 Claims, 5 Drawing Sheets

(56) References Cited

U.S. PATENT DOCUMENTS

| | | | |
|---|---|---|---|
| 6,501,761 B1* | 12/2002 | Pannell et al. | 370/403 |
| 7,590,749 B2* | 9/2009 | Lu et al. | 709/230 |
| 2002/0091795 A1* | 7/2002 | Yip | 709/218 |
| 2003/0195962 A1* | 10/2003 | Kikuchi et al. | 709/226 |
| 2003/0216144 A1* | 11/2003 | Roese et al. | 455/456.1 |
| 2005/0198215 A1* | 9/2005 | Helmerich | 709/220 |
| 2006/0072565 A1* | 4/2006 | Yazaki et al. | 370/389 |
| 2006/0227779 A1* | 10/2006 | Shimizu | 370/389 |
| 2008/0069110 A1* | 3/2008 | Rijsman | 370/395.5 |
| 2008/0304485 A1* | 12/2008 | Sinha et al. | 370/392 |
| 2009/0304008 A1* | 12/2009 | Kono et al. | 370/395.53 |
| 2010/0135307 A1* | 6/2010 | Nakagawa | 370/395.53 |
| 2011/0188503 A1* | 8/2011 | Hewson | 370/392 |

FOREIGN PATENT DOCUMENTS

| | | |
|---|---|---|
| CN | 101547194 A | 9/2009 |
| WO | WO 2010/020099 A1 | 2/2010 |

OTHER PUBLICATIONS

First Office Action for Chinese App. No. 201010248216.1 dated Oct. 17, 2013, along with English Translation of Text of Office Action, 5 pages.

* cited by examiner

METHOD AND SYSTEM OF ACCESSING NETWORK FOR ACCESS NETWORK DEVICE

FIELD

The present invention relates to the technical field of novel networks, and in particular, to a method for an access network device to access a network, a system for an access network device to access a network, a node server and an access switch.

BACKGROUND

Novel networks (including Internet) enable the exchange of information and other information resources between different individuals and organizations. Generally, a network concerns the technologies of path, transmission, signaling and network management, etc. Such technologies have been widely set forth in various documents among which *Telecommunications Convergence* (McGraw-Hill, 2000) by Steven Shepherd, *The Essential Guide to Telecommunications*, Third Edition (Prentice Hall PRT, 2001) by Annabel Z. Dodd, or *Communications Systems and Networks*, Second Edition (M&T Books, 2000) by Ray Horak gives an overview of the technologies. The progression in such technologies obtained in the past has fully built up the speed and quality of information transmission and lowered the cost thereof.

The path technology for connecting a terminal to a wide area transmission network (for example, a local area loop of a terminal apparatus and the network edge) has been developed from a modem of 14.4, 28.8 and 56K to technologies including ISDN, T1, cable modem, DSL, Ethernet and wireless connection.

At present, transmission technologies used in a wide area network include: synchronous optical network (SONET), Dense Wavelength Division Multiplexing (DWDM), Frame Relay, Asynchronous Transmission Mode (ATM) and Resilient Packet Ring (RPR).

Among all the different signaling technologies (for example, protocols and methods for establishing, maintaining and terminating a communication in a network), Internet Protocol (IP) is applied most widely. In fact, almost all the communication and network specialists consider that an IP-based network (for example, Internet) that integrates audio (for example, telephone), video and data networks is an inevitable trend. Just as described by an author: there's one thing that is clear, that is, an IP-based train that integrates various networks has drawn out of the station, some passengers are eager in this trip, and others are pulled forward with reluctance and cry, scream, struggle and list all sorts of defects of IP; however, in spite of all the defects thereof, IP has been adopted as a industry standard, and no other technology, except for IP, has such a large potentiality and development space. (Abstracted from *IP Convergence: Building the Future*, by Susan Breidenbach, Network World, Aug. 10, 1998).

With the explosive increment of Internet services, the application range thereof has been extended to each field and each industry in the society. In the view point of telecommunication industry, more and more traditional telecommunication services employ IP for transmission, i.e., so-called Everything Over IP. The framework of the current telecommunication network will gradually turn from circuit switching and the networking technology thereof to a new framework based on packet switching, in particular, IP; and services over telecommunication network will turn from telephone service to data service.

TCP/IP Network Protocol

TCP/IP (Transmission Control Protocol/Internet Protocol) is a protocol most widely applied over the world at present, and the prevalence thereof is closely related to the impetuous development of Internet. Originally, TCP/IP is designed for the prototype of Internet, ARPANET, for providing a full set of protocols that are convenient and practical and can be applied on various networks. It is proved by facts that TCP/IP has accomplished its tasks, it makes network interconnection easy, and it enables more and more networks to participate in the network interconnection, thereby becoming a de facto standard of Internet.

Application Layer: application layer is a general term for all applications that users face. On this layer, there exist a lot of protocols from the TCP/IP protocol family to support different applications, and the implementation of many familiar Internet-based applications cannot be separated from these protocols. For example, HTTP protocol used in World Wide Web (WWW) access, FTP protocol used in file transmission, SMTP used in e-mail sending, DNS protocol used in domain name resolution, Telnet protocol used in remote logon and so on all belong to TCP/IP on the application layer; for users, patterned operating interfaces constructed by software are seen, but in fact, the above protocols are operated in the background.

Transmission Layer: the function of this layer is mainly to provide communication between applications, and on this layer, protocols from the TCP/IP protocol family include TCP and UDP.

Network Layer: network layer is a very crucial layer in the TCP/IP protocol family, which mainly defines the format of IP address, thereby data of different application types can be transmitted on the Internet smoothly, and IP protocol is a network layer protocol.

Network Interface Layer: this is the lowest layer of TCP/IP software, which is responsible for receiving an IP packet and sending it via a network, or receiving a physical frame from a network, extracting an IP datagram and delivering it to an IP layer.

How does IP implement network interconnection? Network systems and devices manufactured by various manufacturers, for example, Ethernet and packet switching network, etc., cannot intercommunicate with each other, the main reason is that the formats of the basic units (technically referred to as "frames") of data transmitted by them are different. In fact, IP protocol is a set of protocol software consisted of software programs, and it unitedly converts various different "frames" into the format of "IP packet", such conversion is a most important feature of Internet, i.e., a feature of "openness", which makes all computers able to realize intercommunication on the Internet.

Then, what is "data packet"? And what feature does it have? Data packet is also a form of packet switching, that is, data to be transmitted are segmented into "packets" and then transmitted out. However, it belongs to "connectionless type", that is, each "packet" is transmitted out as an "independent message", so it is called "data packet". Thus, before communication starts, no circuit needs to be connected first, and respective packets will not necessarily be transmitted via one and the same route, so it is called "connectionless type". Such a feature is very important, and in the case of text information transmission, it greatly improves the robustness and security of the network.

Each data packet has two parts, header and message. Header contains necessary contents such as destination address, etc., so that each data packet can correctly reach its destination via different routes. At the destination, the data packets recombine and restore to the data sent originally. This requires that IP has the functions of packet packaging and assembling.

During the practical transmission process, a data packet also needs to change the data packet length according to the packet size specified by the network it passes, the maximum length of an IP data packet may reach 65535 bytes.

Quality of Service (QoS) is a main problem of IP Internet. Through the ages, countless research reports try to solve this problem; however, if we arrange the main milestones of QoS in time order, it will be readily seen that this is a helpless history in which QoS of Internet continuously lowers its requirements and continuously fails. From "Inte Serv" (1990) to "Diff Serv" (1997) and then to "Lightload" (2001), the summation of various partial QoS improving solutions that seem effective is still far from the target of network-wide QoS. QoS seems nearby, but in fact it's too far away to reach.

At the early stage of IP Internet, video application has become a target of network service, for example, MBone. Due to the lack of an effective QoS, no video communication service with a commercial value can be developed in a long term, which weakens the profit-earning capacity of IP Internet. Therefore, it has a great commercial value to solve the quality problem of network transmission. The quality problem of network transmission specifically appears as packet loss and error code. Computer files are not sensitive to errors in transmission; so long as there exists a TCP retransmission mechanism, a computer may consider the network as usable even if a great part of data packets are lost during the transmission process. However, if packet loss rate and error code rate are higher than 1/1,000, the quality of video and audio will be lowered for synchronous video. Empirical data tells us that high-quality video communication even requires that packet loss and error code should be lower than 1/100,000. Test data from the current network environment show that most packet loss occurs inside a router, and error codes generated during optical fiber transmission may almost be neglected.

Why can't "Inte Serv" succeed?

"Inte Serv" is established on the basis of reserved independent stream resources by employing Resource Reservation SetupProtocol (RSVP). In large-scale network environment, if a part of bandwidth resources can be reserved between two video terminals, it may be specially used by the video service; however, although this sounds good, it is impracticable in fact.

Firstly, this solution requires network-wide device reconstruction, which equals to reestablishing the network, and it is almost impossible in practical operation.

Next, even if network-wide reconstruction is implemented, for example, a bandwidth of 2 Mbps is kept for a 2 Mbps video service in each switch, can QoS problem be solved? The answer is No.

The so-called 2 Mbps bandwidth of RSVP is only considered macroscopically, if data in one second is sent in the first half second centralizedly, a problem will arise and periodic burst trafficburst traffic will be formed. Because the core concept of IP Internet is "Best Efforts", at each network node, the switch always tries its best to forward data at the highest speed. After a video stream passes multiple levels of switches, it will be certain that traffic distribution becomes non-uniform. When multiple non-uniform and asynchronous streams are combined, greater non-uniformity will be generated in a period of time; that is, periodic congestion of network traffic is certain to appear. With the increasing of video user numbers, no upper limit can be given to periodic congestion, and when it exceeds the internal storage capacity of the switch, packet loss will be directly caused.

Why does "Diff Serv" fail?

After "Inte Serv" made its appearance for 7 years, a novel method "Diff Serv" starts to prevail. "Diff Serv" tries to provide a network service being superior to "Best Efforts". Such a method does not require complex network-wide resource reservation, and it is easy to implement. It only needs to put a "priority" label on each data packet and the network switch processes video data with "priority" first. The basic theory thereof is just like that a bank issues a gold card to a VIP client and the queuing time of a high-end client may be effectively reduced. This method also sounds good, but in fact, it is impracticable, too.

There exists one easy fact that cannot be ignored: the traffic of a single video service is much larger than that of a traditional non-video service (over a hundredfold).

When there are a few video users, video data packets will be seen almost everywhere on the network. If most of the data packets have a "gold card", VIP is meaningless. Additionally, because IP interconnection networking is not compulsory, although QoS has drawn up a set of moral standards for users that maintain their personal integrity during chaotic times, it is unpractical to require all the users to carry the standards into effect.

Therefore, "Diff Serv" is only effective in a few enterprise private networks, and it is difficult to be effectively popularized in large-scale public networks.

Why can't "Light load" succeed?

Since IP Internet was popularized step by step, people have been unremittingly seeking after an effective prescription for network QoS. After more than 10 years' brain squeeze, network technicians work out two QoS solutions, but neither is ideal. Under the macro-environment in which people loose confidence in solving QoS, some anonymous people put forward a method, i.e., "Light load". The basic design consideration thereof is so-called light-load network, and it is considered that so long as a sufficient bandwidth is provided and optical fiber enters users' houses, there should be no need to worry about network congestion.

Is the design consideration of light-load network feasible? The answer is also No.

The current network technicians seem to miss a basic theory: the root of network packet loss phenomenon is traffic non-uniformity. Macroscopically, when the sending speed is high in one time period, it is certain to cause jam in another time period; no upper limit can be given to the peak traffic of the network so long as the network traffic is non-uniform, and any arbitrary large bandwidth may be occupied in a short time.

Actually, a reasonably good video program may be transmitted so long as there exists a bandwidth of 2 Mbps; if a bandwidth of 8 Mbps is provided, a video content of HDTV quality may be transmitted. However, if we randomly browse a text or a picture on an ordinary web site, the instantaneous traffic will be tens of folds of that of HDTV, because most of the current web site servers use a Gigabit network interface. If the traffics of a lot of similar web sites just collide, the burst trafficburst traffic generated in a certain short time will exceed the traffic required by all network-wide users that use HDTV, and a network with any bandwidth can be occupied. As shown by statistical analysis, such a collision is frequent.

IP Internet tries to absorb the instantaneous traffic by employing a memory, which causes the increase of transmission delay. The storage capacity is limited, but the burst trafficburst traffic has no upper limit; therefore, by employing the memory method, it can only improve the packet loss of the current device, and the burst traffic absorbed at the current node will put much pressure on the next node. Video traffic is ceaseless, and the storage mode of the switch intensifies the accumulation of the burst traffic to a weak node, thus network packet loss is inevitable.

By employing light load plus "Diff Serv" technology, the current network constructors may deal with narrowband VoIP voice services. This is because voice does not occupy the main part of total traffic on the network; once jam occurs, voice will take priority by sacrificing computer files. However, for high-bandwidth video communication, only temporary improvement can be obtained by partial expansion. If expansion is also carried out at other nodes, the non-uniformity of network traffic will increase therewith, so that the effect of the originally expanded part will be lowered. If expansion is carried uniformly network wide, the transmission quality will return to that before expansion. In other words, overall expansion is ineffective.

At preset, device manufacturers recommend ultra-wideband access networks of tens or even hundreds of Megabit to each household. However, even if optical fiber enters each household, it is difficult to exhibit a video communication service with good QoS to the consumers. In spite of what complex QoS measures are taken, the transmission quality of IP Internet can only be "improved", and no quality of network transmission can be "guaranteed".

SUMMARY

The technical problem to be solved by the invention is to provide a method for an access network device to access a network, which may guarantee a stable transmission rate of the data packet transmission and avoid time delay, thereby guaranteeing the quality of the network transmission.

One embodiment of the invention further provides a system for an access network device to access a network, a node server and an access switch, which may guarantee the implementation and application of the above method in practice.

To solve the above technical problem, one embodiment of the invention discloses a method for an access network device to access a network, which comprises the following steps:

powering on an access switch, and setting in its internal downlink protocol packet address table that all downlink protocol packets are to be oriented to a CPU module;

receiving, by the access switch, a downlink protocol packet sent from a node server and orienting the downlink protocol packet to the CPU module of the access switch according to the settings of the downlink protocol packet address table; and generating, by the CPU module, an uplink protocol packet and sending the uplink protocol packet to the node server; wherein the downlink protocol packet contains an access network address that is to be allocated;

sending, by the node server, a network access command to the access switch, wherein the network access command contains an access network address of the access switch, and the access network address is the access network address to be allocated in the downlink protocol packet received by the access switch; and updating, by the access switch, its internal downlink protocol packet address table, as orienting only a protocol packet with a destination address being its own access network address to the CPU module.

The access switch accesses the network by the above steps. In the embodiments of the invention, the "network" accessed refers to a novel network. Such a novel network has a network structure that may be controlled centralizedly. The network may have the types of tree network, star network and ring network, etc.; but on this basis, a centralized control node is needed to control the whole network.

The novel network is divided into two parts: an access network and a metropolitan area network. Devices on the access network part may be mainly divided into 3 categories: a node server, an access switch and a terminal (including various set-top boxes, code plates and storages, etc.). Wherein, a node server is a node in the access network that has a centralized control function, and it may control the access switch and the terminal. The node server may be directly connected with the access switch, and it may be directly connected with the terminal. Similarly, devices on the metropolitan area network part may be divided into 3 categories: a metropolitan area server, a node switch and a node server. Wherein, the node server is just the node server on the access network part, that is, the node server not only belongs to the access network part, but also belongs to the metropolitan area network part. The metropolitan area server is a node on the metropolitan area network that has a centralized control function, and it may control the node switch and the node server. The metropolitan area server may be directly connected with the node switch, or it may be directly connected with the node server. Thus it can be seen that the whole novel network has a network structure that is controlled centralizedly by layers, while the networks controlled under the node server and the metropolitan area server may have various structures, for example, tree type, star type and ring type, etc.

In a specific implementation, other subordinate access network devices are often connected under the access switch. In such a case, the node server will send a port allocation packet to an access switch that has accessed the network. That is, as one preferred embodiment of the invention, when an access switch that has accessed the network receives a port allocation packet sent by the node server, the method further comprises the following steps:

orienting, by the access switch that has accessed the network, the port allocation packet with a destination address being its own access network address to the CPU module; and setting a downlink port to which each port downlink protocol packet is to be oriented in its internal downlink protocol packet address table according to port allocation information in the port allocation packet.

Moreover, when the access switch that has accessed the network receives a port downlink protocol packet sent by the node server, the method further comprises the following steps:

orienting, by the access switch, the port downlink protocol packet to a corresponding downlink port according to the setting of its internal downlink protocol packet address table, wherein the port downlink protocol packet contains an access network address that is to be allocated;

sending, by the node server, a network access command to a certain subordinate network device that is connected to the downlink port of the access switch, when the node server receives a port uplink protocol packet sent from said certain subordinate network device; wherein the network access command contains the access network address of the subordinate network device, and the access network address is the access network address to be allocated in the port downlink protocol packet received by the subordinate network device.

In this embodiment, the subordinate access network device may comprise an access switch or a terminal.

When the subordinate access network device is an access switch, the access switch will update, according to the network access command, its internal downlink protocol packet address table as setting that a protocol packet with a destination address being its own access network address is to be oriented to the CPU module, and it will send a network access command response to the node server.

When the subordinate access network device is a terminal, the terminal will send a network access command response to the node server.

After the node server receives the network access command response sent by the access switch, it knows that the access switch has accessed the network, and then it sends a state downlink protocol packet to the access switch periodically; that is, as one preferred embodiment of the invention, when the access switch has accessed the network and receives a state downlink protocol packet sent by the node server periodically, the method further comprises the following steps:

orienting, by the access switch that has accessed the network, the state downlink protocol packet with a destination address being its own access network address to the CPU module according to the settings of its internal downlink protocol packet address table; and generating, by the CPU module, a state uplink protocol packet, and sending the state uplink protocol packet to the node server.

For a subordinate access network device connected under a certain access switch, the node server will also periodically send a state downlink protocol packet to the subordinate access network device; that is, as one preferred embodiment of the invention, when the access switch has accessed the network and receives a state downlink protocol packet sent by the node server periodically, the method further comprises the following steps:

orienting, by the access switch that has accessed the network, a state downlink protocol packet with a destination address being the access network address of the subordinate access network device to the corresponding port according to the settings of its internal downlink protocol packet address table, and transferring the state downlink protocol packet to the corresponding subordinate access network device via the port; and generating, by the subordinate access network device, a state uplink protocol packet for the state downlink protocol packet received, and sending the state uplink protocol packet to the node server.

In a specific implementation, an uplink protocol packet address table may also be set inside the access switch; in such a case, the method further comprises the following step:

when the access switch being powered on, setting an uplink port to which all uplink protocol packets are to be oriented in its internal uplink protocol packet address table.

As another implementation mode, a data packet address table may also be set inside the access switch; in such a case, the method further comprises the following step:

when the access switch being powered on, setting in its internal data packet address table that the orientation of all data packets is closed.

One embodiment of the invention may further include a process in which a node server accesses the network; after the node server is powered on, it imports the registration information of a subordinate access network device to the CPU, obtains a metropolitan area network address, and configures its own access network address.

As one preferred embodiment of the invention, the process in which a node server accesses the network may comprise the following steps:

accessing the node server in a metropolitan area network, wherein the metropolitan area network is a network with a centralized control function, which comprises a metropolitan area server, a node switch and a node server, wherein the node switch is connected between the metropolitan area server and the node server; and the step of accessing the node server in a metropolitan area network comprises:

accessing a metropolitan area network device in the metropolitan area network, and allocating, by a metropolitan area server with a centralized control function in the metropolitan area network, a protocol label and a metropolitan area network address to the device that accesses the network;

wherein, the metropolitan area network device comprises a node switch and a node server, and the protocol label is adapted to describe the connection between the metropolitan area network device and the metropolitan area server; when there exist a plurality of connections between one and the same metropolitan area network device and the metropolitan area server, the metropolitan area server allocates a different protocol label to each connection;

allocating, by the metropolitan area server, a data label of a corresponding service to each service request across the metropolitan area network, wherein the data label is adapted to describe a connection between node servers related to the service.

Preferably, the label is divided into an IN label and an OUT label, wherein the IN label refers to a label by which a packet enters a metropolitan area server or a node switch, the OUT label refers to a label by which the packet leaves the metropolitan area server or the node switch;

The IN label and OUT label of one and the same data packet may be different, or may be the same.

More specifically, the step of accessing a metropolitan area network device in the metropolitan area network and allocating by a metropolitan area server a protocol label and a metropolitan area network address comprises the following substeps:

sending, by the metropolitan area server, metropolitan area query label packets to all of its downlink ports, wherein each metropolitan area query label packet contains a standby protocol label allocated by the metropolitan area server;

receiving, by the node server, a metropolitan area query label packet sent by the metropolitan area server after said node server is powered on, and then returning a metropolitan area response label packet to the metropolitan area server, wherein the metropolitan area response label packet contains a serial number of the metropolitan area network device and a port number of a port that receives the metropolitan area query label packet;

verifying, by the metropolitan area server according to the serial number in the metropolitan area response label packet after receiving the packet, whether the metropolitan area network device is registered; if it is registered, sending a network access command to the port of the metropolitan area network device that receives the metropolitan area query label packet, wherein the network access command contains a metropolitan area network address allocated by the metropolitan area server to the metropolitan area network device and the standby protocol label; and returning, by the corresponding port of the metropolitan area network device, a network access command response after receiving the network access command, and the metropolitan area network device accessing the metropolitan area network.

As another preferred embodiment of the invention, the node server may access the metropolitan area network in the mode of an IP node; that is, the metropolitan area network has an IP network structure. The specific implementation thereof may still employ the existing IP network access mode, so it will not be described again here.

In order to realize better centralized control and management, one embodiment of the invention may further comprise the following steps:

setting, by the node server in its internal downlink protocol packet address table, a downlink port to which each downlink protocol packet is to be oriented respectively; and sending, by the node server, a downlink protocol packet via a corresponding downlink port according to the settings of the downlink protocol packet address table.

More preferably, one embodiment of the invention may further comprise the following steps:

generating, by the node server, a port allocation packet containing port allocation information; and sending, by the node server, the port allocation packet via a corresponding downlink port according to the settings of its internal downlink protocol packet address table.

For better allocating and managing the address of a subordinate access network device, an address information table is further set inside the node server, in which address occupation information, device identification information and device resource information are recorded. For the operation on the address information table, it may include the following situations:

Situation 1: initializing the address information table when the node server is powered on, wherein the initializing operation comprises:

filling the access network address of the node server in a blank item of the address information table, and marking the address occupation information as used;

filling the device identification information as the current node server; and filling the device resource information as port information of the current node server.

Situation 2: updating the address information table according to the setting of a downlink port to which each downlink protocol packet is to be oriented in an internal downlink protocol packet address table of the node server, wherein the update operation comprises:

filling an access network address to be allocated in each downlink protocol packet respectively into a blank item of the address information table, and marking the address occupation information as standby.

Situation 3: updating the address information table according to the setting of a downlink port of other access devices to which a port downlink protocol packet is to be oriented, wherein the update operation comprises:

filling an access network address to be allocated in each port downlink protocol packet respectively into a blank item of the address information table, and marking the address occupation information as standby.

Situation 4: updating the address information table when the node server receives a network access command response sent by the access switch, wherein the update operation comprises:

marking the address occupation information in an item corresponding to the access network address of the access switch as used;

updating the device identification information as the current access switch; and updating the device resource information as the port information of the current access switch and the access network address information of an access network device connected to a port thereof.

Situation 5: updating the address information table when the node server receives a network access command response sent by a terminal, wherein the update operation comprises:

marking the address occupation information in an item corresponding to the access network address of the terminal as used;

updating the device identification information as the current terminal; and updating the device resource information as the port information of the current terminal the access network address information of an access network device connected to a port thereof.

Situation 6: stopping sending a state downlink protocol packet to the access switch and updating the address information table, if the node server does not receive a state uplink protocol packet sent by the access switch in a preset time; wherein the update operation comprises:

marking the address occupation information in an item corresponding to the access network address of the access switch as not used; and removing the device identification information and the device resource information.

Situation 7: stopping sending a state downlink protocol packet to the subordinate access network device and updating the address information table, if the node server does not receives a state uplink protocol packet sent by the subordinate access network device in a preset time; wherein the update operation comprises:

marking the address occupation information in an item corresponding the access network address of the subordinate access network device as not used; and removing the device identification information and the device resource information.

For easy to control and manage a subordinate access network device and a communication path for data transfer, the address information table of the node server may further contain the uplink and downlink traffic information of a port of the current access network device.

More preferably, an uplink protocol packet address table may be further set inside the node server, and the method further comprises the following step:

when the node server being powered on, setting in its internal uplink protocol packet address table that all uplink protocol packets are to be oriented to the CPU module.

More preferably, a data packet address table may be further set inside the node server, and the method further comprises the following step:

when the node server being powered on, setting in its internal data packet address table that the orientation of all data packets is closed.

For a subordinate access network device that requests for accessing, usually, the node server will first determines whether it is valid, and send a network access command to the subordinate access network device only when it is valid; that is, in one preferred embodiment of the invention, the method further comprises the following steps:

determining, by the CPU module of the node server according to a network access command response packet, whether registration information of the access switch exists, if yes, it is determined that the access switch is valid; otherwise, it is determined that the access switch is invalid; and sending a network access command if the access switch is valid.

Or, determining, by the CPU module of the node server according to a network access command response packet, whether registration information of the access network device exists, if yes, it is determined that the access network device is valid; otherwise, it is determined that the access network device is invalid; and sending a network access command if the access switch is valid.

Generally, the registration information may contain device type and device identification.

One embodiment of the invention further comprises a node server, which comprises the following modules:

a downlink protocol packet sending module, for sending a downlink protocol packet to an access switch, wherein the downlink protocol packet contains an access network address that is to be allocated;

an uplink protocol packet receiving module, for receiving an uplink protocol packet returned by the access switch for the downlink protocol packet; and a first network access command sending module, for sending a network access command to the corresponding access switch according to the uplink protocol packet receive, wherein the network access command contains an access network address allocated to the access switch, and the access network address is the access network address to be allocated in the downlink protocol packet received by the access switch.

For controlling and managing a subordinate access network device connected under the access switch, as one preferred embodiment of the invention, the node server may further comprise the following module:

a port allocation packet sending module, for sending a port allocation packet to an access switch that has accessed the network, wherein the port allocation packet contains port allocation information, and the port allocation information is the information of each downlink port of the access switch to which each port downlink protocol packet is to be oriented.

More preferably, The node server may further comprise the following modules:

a port downlink protocol packet sending module, for sending a port downlink protocol packet to an access switch that has accessed the network, wherein the port downlink protocol packet contains an access network address that is to be allocated;

a port uplink protocol packet receiving module, for receiving a port uplink protocol packet sent by a certain subordinate network device that is connected to the downlink port of the access switch; and a second network access command sending module, for sending a network access command to the subordinate access network device, wherein the network access command contains the access network address of the subordinate network device, and the access network address is the access network address to be allocated in the port downlink protocol packet received by the subordinate network device.

In this embodiment, the node server may further comprise:

a network access response receiving module, for receiving a network access command response sent by the subordinate access network device.

In the embodiments of the invention, the subordinate access network device may comprise an access switch or a terminal.

For detecting the operational aspects of an access switch directly connected under the node server, the node server further comprises the following modules:

a state downlink protocol packet sending module, for periodically sending a state downlink protocol packet to an access switch that has accessed the network; and a first state uplink protocol packet receiving module, for receiving a state uplink protocol packet returned by the access switch for the state downlink protocol packet.

For detecting the operational aspects of a subordinate access network device connected under the access switch, the node server further comprises the following module:

a second state uplink protocol packet receiving module, for receiving a state uplink protocol packet returned by the subordinate access network device for the state downlink protocol packet.

In a specific implementation, the node server further comprises the following module:

an initializing module, for importing the registration infoii-nation of a subordinate access network device to the CPU, obtaining a metropolitan area network address and configuring its own access network address after being powered on.

For accessing a metropolitan area network, the node server may further comprise the following modules:

a protocol label and address acquiring module, for obtaining a protocol label and a metropolitan area network address allocated from a metropolitan area server after accessing an metropolitan area network, wherein the protocol label is adapted to describe a connection between a node server and a metropolitan area server; when a plurality of connections exist between one and the same node server and a superior connection device, it obtains different protocol labels corresponding to each connection, wherein the superior connection device includes a node switch and a metropolitan area server; wherein the metropolitan area network is a network with a centralized control function, which comprises a metropolitan area server, a node switch and a node server, wherein the node switch is connected between the metropolitan area server and the node server;

a data label acquiring module, for obtaining a data label allocated corresponding to the current service from the metropolitan area server for each service request across the metropolitan area network, wherein the data label is adapted to describe a connection between node servers related to the service;

a label adding module, for adding a corresponding protocol label or data label to a protocol packet or data packet sent by the node server to the metropolitan area network; and a label deleting module, for removing the corresponding protocol label or data label from the protocol packet or data packet received from the metropolitan area network.

Preferably, the label is divided into an IN label and an OUT label, wherein the IN label refers to a label by which a packet enters a metropolitan area server or a node switch, and the OUT label refers to a label by which the packet leaves the metropolitan area server or the node switch;

the IN label and OUT label of one and the same data packet may be different, or may be the same; and the label packet includes a protocol label and a data label.

More preferably, the node server may further comprise:

an address-label mapping table, for recording, for each service across the metropolitan area network, a binding relation between the access network address and the OUT label of two terminals across the metropolitan area network; wherein, the access network address is an address allocated by each node server to a network access device connected under the node server;

then, the label adding module looks up, according to the address-label mapping table, an OUT label corresponding to a protocol packet or data packet that is sent by the node server to the metropolitan area network, and adds the OUT label that is found and sends the protocol packet or data packet.

In such a case, the node server may further comprise:

a protocol packet label table, for setting that all metropolitan area protocol packets are to be oriented to a CPU module when the node server is powered on, wherein the metropolitan area protocol packet contains a metropolitan area query label packet and a metropolitan area service request packet sent by the metropolitan area server.

And/or, the node server may further comprise the following modules:

a response packet label table, for orienting a metropolitan area response label packet to a corresponding uplink port respectively;

a response packet label table initializing module, for setting that the orientation of all metropolitan area response label packets is closed when the node server is powered on;

a response packet label table configuring module, for modifying its own response packet label table and orienting the metropolitan area response label packet corresponding to the protocol label to the uplink port that receives the metropolitan area query label packet, after receiving the metropolitan area query label packet sent by the metropolitan area server.

As another implementation mode for accessing the metropolitan area network, the node server may comprise the following module:

an IP network access module, for accessing a metropolitan area network in the mode of an IP node, wherein the metropolitan area network has an IP network structure.

Preferably, the node server may further comprise:

a Table 0 initialization configuring module, for initializing, when being powered on, its internal downlink protocol packet address table as that the orientation of each downlink protocol packet is closed.

In order to realize better centralized control and management, the node server may further comprise:

a first Table 0 setting module, for setting, in its internal downlink protocol packet address table, a downlink port to which each downlink protocol packet is to be oriented respectively;

wherein the downlink protocol packet sending module sends a downlink protocol packet via a corresponding downlink port according to the settings of the downlink protocol packet address table.

More preferably, the node server may further comprise:

a port allocation packet generating module, for generating a port allocation packet containing the port allocation information;

wherein the port allocation packet sending module sends the port allocation packet via a corresponding downlink port according to the settings of its internal downlink protocol packet address table.

For better allocating and managing the address of a subordinate access network device, an address information table is further set inside the node server, in which address occupation information, device identification information and device resource information are recorded.

According to different operation situations of the address information table, the node server may further comprise the following modules:

Situation 1: the node server further comprises: an address information table initializing module, for initializing an address information table when powered on, wherein the initializing comprises:

filling the access network address of the node server in a blank item of the address information table, and marking the address occupation information as used;

filling the device identification information as the current node server; and filling the device resource information as port information of the current node server.

Situation 2: the node server further comprises:

a first address information table updating module, for updating the address informiation table according to the setting of a downlink port to which each downlink protocol packet is to be oriented in an internal downlink protocol packet address table of the node server, wherein the updating comprises:

filling an access network address to be allocated in each downlink protocol packet respectively into a blank item of the address information table, and marking the address occupation information as standby.

Situation 3: the node server further comprises:

a second address information table updating module, for updating the address information table according to the setting of a downlink port of other access devices to which a port downlink protocol packet is to be oriented, wherein the updating comprises:

filling an access network address to be allocated in each port downlink protocol packet respectively into a blank item of the address information table, and marking the address occupation information as standby.

Situation 4: the node server further comprises:

a third address information table updating module, for updating the address information table when receiving a network access command response sent by the access switch, wherein the updating comprises:

marking the address occupation information in an item corresponding to the access network address of the access switch as used;

updating the device identification information as the current access switch; and updating the device resource information as the port information of the current access switch and the access network address information of an access network device connected to a port thereof.

Situation 5: the node server further comprises:

a fourth address information table updating module, for updating the address information table when receiving a network access command response sent by a subordinate access network device, wherein the updating comprises:

marking the address occupation information in an item corresponding the access network address of the subordinate access network device as used;

updating the device identification information as the current subordinate access network device; and updating the device resource information as the port information of the current subordinate access network device and the access network address information of an access network device connected to a port thereof.

Situation 6: the node server further comprises:

a first state downlink protocol packet ending module, for stopping sending a state downlink protocol packet to the access switch when no state uplink protocol packet sent by the access switch is received in a preset time; and a fourth address information table updating module, for updating the address information table when stopping sending a state downlink protocol packet to the access switch; wherein the updating comprises:

marking the address occupation information in an item corresponding to the access network address of the access switch as not used; and removing the device identification information and the device resource information.

Situation 7: the node server further comprises:

a second state downlink protocol packet ending module, for stopping sending a state downlink protocol packet to the subordinate access network device when no state uplink protocol packet sent by the subordinate access network device is received in a preset time; and a fifth address information table updating module, for updating the address information table when stopping sending a state downlink protocol packet to the subordinate access network device;

wherein the updating comprises:

marking the address occupation information in an item corresponding the access network address of the subordinate access network device as not used; and removing the device identification information and the device resource information.

For easy to control and manage a subordinate access network device and a communication path for data transfer, the address information table further contains the uplink and downlink traffic information of a port of the current access network device.

More preferably, an uplink protocol packet address table is further set inside the node server, and the node server further comprises:

a Table 1 initialization configuring module, for setting, when powered on, in its internal uplink protocol packet address table, that all uplink protocol packets are to be oriented to the CPU module.

More preferably, a data packet address table is further set inside the node server, and the node server further comprises:

a data packet address table configuring module, for setting, when powered on, in its internal data packet address table, that the orientation of all data packets is closed.

For a subordinate access network device that requests for accessing, usually, the node server will first determines whether it is valid, and send a network access command to the subordinate access network device only when it is valid; that is, in one preferred embodiment of the invention, the node server further comprises:

a first verifying module, for determining whether registration information of the access switch exists, if yes, it is determined that the access switch is valid; otherwise, it is determined that the access switch is invalid;

if valid, the first network access command sending module is triggered.

Or, a second verifying module, for determining whether registration information of the access network device exists, if yes, it is determined that the access network device is valid; otherwise, it is determined that the access network device is invalid;

if valid, the second network access command sending module is triggered.

One embodiment of the invention further discloses an access switch, which comprises the following modules:

a Table 0 initialization configuring module, for setting, when powered on, in its internal downlink protocol packet address table, that all downlink protocol packets are to be oriented to a CPU module;

a downlink protocol packet receiving module, for receiving a downlink protocol packet sent by the node server, and orienting the downlink protocol packet to the CPU module of the access switch according to the settings of the downlink protocol packet address table, wherein the downlink protocol packet contains an access network address that is to be allocated;

an uplink protocol packet returning module, for generating an uplink protocol packet by the CPU module and sending the uplink protocol packet to the node server;

a first network access command receiving module, for receiving a network access command sent by the node server, wherein the network access command contains an access network address of the access switch, and the access network address is the access network address to be allocated in the downlink protocol packet received by the access switch; and a first Table 0 setting module, for updating its internal downlink protocol packet address table as orienting only a protocol packet with a destination address being its own access network address to the CPU module.

After accessing the network, the access switch further comprises the following modules:

a port allocation packet receiving module, for receiving a port allocation packet sent by the node server after accessing the network; wherein the port allocation packet contains port allocation information, and the port allocation information is the information of each downlink port of the access switch to which each port downlink protocol packet is to be oriented;

a first orienting module, for orienting a port allocation packet with a destination address being its own access network address to a CPU module; and a second Table 0 setting module, for setting, according to the port allocation information, in its internal downlink protocol packet address table, a downlink port to which each port downlink protocol packet is to be oriented.

More preferably, the access switch further comprises the following modules:

a port downlink protocol packet receiving module, for receiving a port downlink protocol packet sent by the node server after accessing the network, wherein the port downlink protocol packet contains an access network address that is to be allocated; and a second orienting module, for orienting the port downlink protocol packet to the corresponding downlink port according to the settings of its internal downlink protocol packet address table.

More preferably, the access switch further comprises a network access command response module, for sending a network access command response to the node server.

When receiving a state downlink protocol packet sent by the node server periodically, the access switch further comprises:

a state downlink protocol packet receiving module, for receiving, after accessing the network, a state downlink protocol packet sent by the node server periodically;

a third orienting module, for orienting the state downlink protocol packet with a destination address being its own access network address to the CPU module according to the settings of its internal downlink protocol packet address table; and a state uplink protocol packet returning module, for generating a state uplink protocol packet by the CPU module and sending the state uplink protocol packet to the node server.

Preferably, the access switch further comprises:

a fourth orienting module, for orienting a state downlink protocol packet with a destination address being the access network address of the subordinate access network device to the corresponding port according to the settings of its internal downlink protocol packet address table; and transferring the state downlink protocol packet to the corresponding subordinate access network device via the port.

Preferably, an uplink protocol packet address table is further set inside the access switch, and the access switch further comprises:

a Table 1 initialization configuring module, for setting, when powered on, an uplink port to which all uplink protocol packets are to be oriented in its internal uplink protocol packet address table.

Preferably, a data packet address table is further set inside the access switch, and the access switch further comprises:

a data packet address table configuring module, for setting, when powered on, in its internal data packet address table that the orientation of all data packets is closed.

One embodiment of the invention further discloses a system for an access network device to access a network, wherein the access network device comprises a node server and an access switch connected subordinately, wherein the node server comprises: a downlink protocol packet sending module, for sending a downlink protocol packet to an access switch; and a first network access command sending module, for sending a network access command according to an uplink protocol packet returned by the access switch;

the access switch comprises:

a Table 0 initialization configuring module, for setting, when powered on, in its internal downlink protocol packet address table, that all downlink protocol packets are to be oriented to a CPU module;

a downlink protocol packet receiving module, for orienting a downlink protocol packet received to the CPU module of the access switch according to the settings of the downlink protocol packet address table, wherein the downlink protocol packet contains an access network address that is to be allocated;

an uplink protocol packet returning module, for generating an uplink protocol packet by the CPU module and sending the uplink protocol packet to the node server;

a first network access command receiving module, for receiving a network access command sent by the node server, wherein the network access command contains an access network address of the access switch, and the access network address is the access network address to be allocated in the downlink protocol packet received by the access switch; and a first Table 0 setting module, for updating its internal downlink protocol packet address table as orienting only a protocol packet with a destination address being its own access network address to the CPU module.

In a specific implementation, other subordinate access network devices are often connected under the access switch; in such a case, the node server will send a port allocation packet to an access switch that has accessed the network; that is, as one preferred embodiment of the invention, the node server further comprises a port allocation packet sending module for sending a port allocation packet to an access switch that has accessed the network, wherein the port allocation packet contains port allocation information, and the port allocation information is the information of each downlink port of the access switch to which each port downlink protocol packet is to be oriented;

In such a case, the access switch further comprises:

a first orienting module, for orienting a port allocation packet with a destination address being its own access network address to a CPU module; and a second Table 0 setting module, for setting, according to the port allocation information, in its internal downlink protocol packet address table, a downlink port to which each port downlink protocol packet is to be oriented.

Moreover, the node server further comprises a port downlink protocol packet sending module for sending a port downlink protocol packet to an access switch that has accessed the network, wherein the port downlink protocol packet contains an access network address that is to be allocated;

In such a case, the access switch further comprises:

a second orienting module, for orienting the port downlink protocol packet to the corresponding downlink port according to the settings of its internal downlink protocol packet address table.

In a specific implementation, the access network device further comprises a subordinate access network device connected to a downlink port of an access switch that has accessed the network; in such a case, the node server further comprises a second network access command sending module for sending a network access command to the subordinate access network device;

The subordinate access network device comprises:

a port uplink protocol packet returning module, for generating a port uplink protocol packet for the port downlink protocol packet received, and sending the state uplink protocol packet to the node server; and a second network access command receiving module, for receiving a network access command sent by the node server, wherein the network access command contains the access network address of the subordinate access switch, and the access network address is the access network address to be allocated in the port downlink protocol packet received by the subordinate access switch.

In this embodiment, the subordinate access network device comprises an access switch or a terminal.

When the subordinate access network device is an access switch, the access switch further comprises:

a third Table 0 setting module, for updating, according to the network access command, its internal downlink protocol packet address table as setting that a protocol packet with a destination address being its own access network address is to be oriented to the CPU module.

After the node server receives the network access command response sent by the access switch, it knows that the access switch has accessed the network, and then it sends a state downlink protocol packet to the access switch periodically; that is, as one preferred embodiment of the invention, the node server further comprises a state downlink protocol packet sending module, for periodically sending a state downlink protocol packet to an access switch that has accessed the network;

In such a case, the access switch further comprises:

a third orienting module, for orienting the state downlink protocol packet with a destination address being its own access network address to the CPU module according to the settings of its internal downlink protocol packet address table; and a state uplink protocol packet returning module, for generating a state uplink protocol packet by the CPU module and sending the state uplink protocol packet to the node server.

For a subordinate access network device connected under a certain access switch, the node server will also periodically send a state downlink protocol packet to the subordinate access network device; that is, as one preferred embodiment of the invention, the access switch further comprises:

a fourth orienting module, for orienting a state downlink protocol packet with a destination address being the access network address of the subordinate access network device to the corresponding port according to the settings of its internal downlink protocol packet address table; and transferring the state downlink protocol packet to the corresponding subordinate access network device via the port.

When the subordinate access network device is a subordinate access switch, the subordinate access switch further comprises:

a state uplink protocol packet returning module, for generating a state uplink protocol packet for the state downlink protocol packet received, and sending the state uplink protocol packet to the node server.

When the subordinate access network device is a terminal, the terminal further comprises:

a state uplink protocol packet returning module, for generating a state uplink protocol packet for the state downlink protocol packet received, and sending the state uplink protocol packet to the node server.

Preferably, an uplink protocol packet address table is further set inside the access switch, and the access switch further comprises:

a Table 1 initialization configuring module, for setting, when powered on, an uplink port to which all uplink protocol packets are to be oriented in its internal uplink protocol packet address table.

Preferably, a data packet address table is further set inside the access switch, and the access switch further comprises:

a data packet address table configuring module, for setting, when powered on, in its internal data packet address table that the orientation of all data packets is closed.

Preferably, when the node server accesses the network, the node server further comprises:

an initializing module, for importing the registration information of a subordinate access network device to the CPU, obtaining a metropolitan area network address and configuring its own access network address after being powered on.

As one preferred embodiment of the invention, the node server further comprises the following modules for accessing a metropolitan area network:

a protocol label and address acquiring module, for obtaining a protocol label and a metropolitan area network address allocated from a metropolitan area server after accessing an metropolitan area network, wherein the protocol label is adapted to describe a connection between a node server and a metropolitan area server; when a plurality of connections exist between one and the same node server and a superior connection device, it obtains different protocol labels corresponding to each connection, wherein the superior connection device includes a node switch and a metropolitan area server; wherein the metropolitan area network is a network with a centralized control function, which comprises a metropolitan area server, a node switch and a node server, wherein the node switch is connected between the metropolitan area server and the node server;

a data label acquiring module, for obtaining a data label allocated corresponding to the current service from the metropolitan area server for each service request across the metropolitan area network, wherein the data label is adapted to describe a connection between node servers related to the service;

a label adding module, for adding a corresponding protocol label or data label to a protocol packet or data packet sent by the node server to the metropolitan area network; and a label deleting module, for removing the corresponding protocol label or data label from the protocol packet or data packet received from the metropolitan area network.

Preferably, the label is divided into an IN label and an OUT label, wherein the IN label refers to a label by which a packet enters a metropolitan area server or a node switch, and the OUT label refers to a label by which the packet leaves the metropolitan area server or the node switch;

the IN label and OUT label of one and the same data packet may be different, or may be the same; and the label packet includes a protocol label and a data label.

Preferably, the node server further comprises:

an address-label mapping table, for recording, for each service across the metropolitan area network, a binding relation between the access network address and the OUT label of two terminals across the metropolitan area network; wherein, the access network address is an address allocated by each node server to a network access device connected under the node server;

then, the label adding module looks up, according to the address-label mapping table, an OUT label corresponding to a protocol packet or data packet that is sent by the node server to the metropolitan area network, and adds the OUT label that is found and sends the protocol packet or data packet.

Preferably, the node server further comprises:

a protocol packet label table, for setting that all metropolitan area protocol packets are to be oriented to a CPU module when the node server is powered on, wherein the metropolitan area protocol packet contains a metropolitan area query label packet and a metropolitan area service request packet sent by the metropolitan area server.

Preferably, the node server further comprises:

a response packet label table, for orienting a metropolitan area response label packet to a corresponding uplink port respectively;

a response packet label table initializing module, for setting that the orientation of all metropolitan area response label packets is closed when the node server is powered on; and a response packet label table configuring module, for modifying its own response packet label table and orienting the metropolitan area response label packet corresponding to the protocol label to the uplink port that receives the metropolitan area query label packet, after receiving the metropolitan area query label packet sent by the metropolitan area server.

As another preferred embodiment of the invention, the node server further comprises an IP network access module for accessing a metropolitan area network, which is adapted to access a metropolitan area network in the mode of an IP node, wherein the metropolitan area network has an IP network structure.

Preferably, the node server further comprises:

a Table 0 initialization configuring module, for initializing, when being powered on, its internal downlink protocol packet address table as that the orientation of each downlink protocol packet is closed.

Preferably, the node server further comprises:

a first Table 0 setting module, for setting, in its internal downlink protocol packet address table, a downlink port to which each downlink protocol packet is to be oriented respectively;

wherein the downlink protocol packet sending module sends a downlink protocol packet via a corresponding downlink port according to the settings of the downlink protocol packet address table.

Preferably, the node server further comprises:

a port allocation packet generating module, for generating a port allocation packet containing the port allocation information;

wherein the port allocation packet sending module sends the port allocation packet via a corresponding downlink port according to the settings of its internal downlink protocol packet address table.

For better allocating and managing the address of a subordinate access network device, an address information table is further set inside the node server, in which address occupation information, device identification information and device resource information are recorded.

According to different operation situations of the address information table, the node server may further comprise the following modules:

Situation 1: the node server further comprises:

an address information table initializing module, for initializing an address information table when powered on, wherein the initializing comprises:

filling the access network address of the node server in a blank item of the address information table, and marking the address occupation information as used;

filling the device identification information as the current node server; and filling the device resource information as port information of the current node server.

Situation 2: the node server further comprises:

a first address information table updating module, for updating the address information table according to the setting of a downlink port to which each downlink protocol packet is to be oriented in an internal downlink protocol packet address table of the node server, wherein the updating comprises:

filling an access network address to be allocated in each downlink protocol packet respectively into a blank item of the address information table, and marking the address occupation information as standby.

Situation 3: the node server further comprises:

a second address information table updating module, for updating the address information table according to the setting of a downlink port of other access devices to which a port downlink protocol packet is to be oriented, wherein the updating comprises:

filling an access network address to be allocated in each port downlink protocol packet respectively into a blank item of the address information table, and marking the address occupation information as standby.

Situation 4: the node server further comprises:

a third address information table updating module, for updating the address information table when receiving a network access command response sent by the access switch, wherein the updating comprises:

marking the address occupation information in an item corresponding to the access network address of the access switch as used;

updating the device identification information as the current access switch; and updating the device resource information as the port information of the current access switch and the access network address information of an access network device connected to a port thereof.

Situation 5: the node server further comprises:

a fourth address information table updating module, for updating the address information table when receiving a network access command response sent by a subordinate access network device, wherein the updating comprises:

marking the address occupation information in an item corresponding the access network address of the subordinate access network device as used;

updating the device identification information as the current subordinate access network device; and updating the device resource information as the port information of the current subordinate access network device and the access network address information of an access network device connected to a port thereof.

Situation 6: the node server further comprises:

a first state downlink protocol packet ending module, for stopping sending a state downlink protocol packet to the access switch when no state uplink protocol packet sent by the access switch is received in a preset time;

a fourth address information table updating module, for updating the address information table when stopping sending a state downlink protocol packet to the access switch; wherein the updating comprises:

marking the address occupation information in an item corresponding to the access network address of the access switch as not used; and removing the device identification information and the device resource information.

Situation 7: the node server further comprises:

a second state downlink protocol packet ending module, for stopping sending a state downlink protocol packet to the subordinate access network device when no state uplink protocol packet sent by the subordinate access network device is received in a preset time; and a fifth address information table updating module, for updating the address information table when stopping sending a state downlink protocol packet to the subordinate access network device;

wherein the updating comprises:

marking the address occupation information in an item corresponding the access network address of the subordinate access network device as not used; and removing the device identification information and the device resource information.

Preferably, the address information table of the node server further contains the uplink and downlink traffic information of a port of the current access network device.

Preferably, an uplink protocol packet address table is further set inside the node server, and the node server further comprises:

a Table 1 initialization configuring module, for setting, when powered on, in its internal uplink protocol packet address table, that all uplink protocol packets are to be oriented to the CPU module.

Preferably, a data packet address table is further set inside the node server, and the node server further comprises:

a data packet address table is further set inside the node server, and the node server further comprises:

a data packet address table configuring module, for setting, when powered on, in its internal data packet address table, that the orientation of all data packets is closed.

Preferably, the node server further comprises:

a first verifying module, for determining whether registration information of the access switch exists, if yes, it is determined that the access switch is valid; otherwise, it is determined that the access switch is invalid;

if valid, the first network access command sending module is triggered.

Preferably, the node server further comprises:

a second verifying module, for determining whether registration information of the access network device exists, if yes, it is determined that the access network device is valid; otherwise, it is determined that the access network device is invalid; and if valid, the second network access command sending module is triggered.

It should be noted that, as divided according to actual hardware, the node server of the invention mainly comprises a network interface module, a switching engine module, a CPU module and a disk array module; the access switch of the invention mainly comprises a network interface module (downlink network interface module and uplink network interface module), a switching engine module and a CPU module; because the above hardware modules perform different functions for different processing situations, for example, the switching engine module looks up in different address tables for different packets (protocol packet and data packet, etc.), the orientation information of the packets obtained will be different; or, in the case that a CPU module receives a packet, it may configure an address table, or it may resolve the packet and generate a response packet. Thus, for those skilled in the art to better understand the invention, in the embodiments of the invention, the modules related to the node server, the access switch and the system for an access network device to access a network of the invention are mainly described with regard to their functions. However, essentially, such functional modules correspond to the actual hardware modules.

In comparison with the prior art, the invention has the following advantages:

The essential conditions required by a multimedia service is significantly different from those required by a data service (for example, web page text, picture, electronic mail, FTP and DNS service). Especially, a multimedia service is very sensitive to end-to-end delay and delay variation, but it can bear with occasional data loss. Such difference on service requirements indicates that the novel network architecture originally designed for data transmission is not applicable for providing a multimedia service.

In the invention, the address of each network device is allocated by sending a query packet to each communication port in a main control mode, and a clear network topology is established on the main control server end during allocation. Thus, during a specific data packet transmission process, the main control server may directly allocate a corresponding communication link (bacause it clearly knows the device topology of the whole network), without the need of carrying out route negotiation between each network device (the solution of the existing IP protocol), thus a stable transmission rate may be guaranteed, and delay may be avoided.

Next, during the transmission of service data, each data packet of the service is transmitted via the same communication link, which is different from the solution of the existing IP protocol, wherein each data packet solves the routing problem via autonomous negotiation, and the route is unknown before the data packet is delivered, that is, two data packets of one and the same service may be transmitted to the target terminal via different routes. Thus, in comparison therewith, the invention may guarantee a stable transmission rate and avoid delay.

DETAILED DESCRIPTION OF THE EMBODIMENTS

Figure 1:
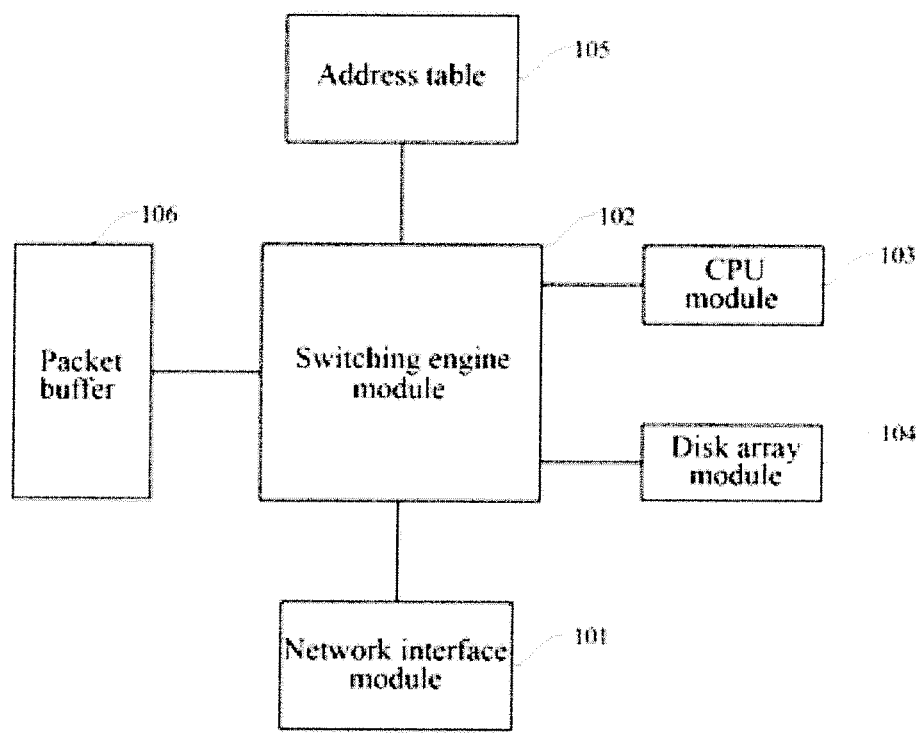
FIG. 1 shows the hardware structural representation of a node server according to the invention.

To make the above objects, characteristics and advantages of the invention more apparent, the invention will be further illustrated below in detail in conjunction with the drawings and embodiments.

I. The core concept of the invention will be briefly introduced below.

It is considered by the inventor that the present invention has the following several sufficient conditions for realizing network-wide QoS:

Firstly, the mechanism about "Best Efforts" in the core theories of IP Internet will certainly cause network traffic non-uniformity and frequent packet loss. In fact, TCP protocol just utilizes the packet loss state of the network to adjust the transmission traffic.

Secondly, the mechanism about "Store & Forward" in the core theories of IP Internet will cause a greater non-uniformity of network traffic at the next node at the time it absorbs the local burst traffic.

Thirdly, the mechanism about "Error Detection & Retransmission" in the core theories of IP Internet will cause an intolerable delay in synchronous video communication, thus it has no use value.

Fourthly, successional network traffic non-uniformity or burst traffic will certainly cause periodic switch (router) packet loss.

Thus it can be seen that, because the computer file burst traffic is discrete in essence and has no subsequent burst traffics, the above core theories of IP Internet have once made the Internet able to transmit a file efficiently. However, when facing the QoS in successional synchronous streaming media transmission, the above core theories of IP Internet becomes a prime criminal that harms the quality of network transmission. A conclusion has been drawn from the above discussion that, none of resource reservation, priority and light-load solutions can solve the QoS of synchronous streaming media fundamentally.

Since none of the above methods is feasible, how can we guarantee the quality of network transmission?

It is considered by the inventor that the current various QoS methods are all based on an error hypothesis. According to this hypothesis, the QoS solution is to provide a privilege of being processed preferentially to video traffic. But in fact, because the network traffic needed by different media forms is extremely non-uniform, video traffic will be the absolute main body on the network so long as a few users use a video service.

Seen from another viewpoint, providing a good quality especially to a majority of the network traffics is equivalent to providing a poor quality especially to a minority of the non-video traffics. Since a majority of the network traffics must require QoS, why not provide QoS to the remaining minority of service traffics that does not require QoS? It is hypothesized that, when subscribing a airline ticket, 1000 passengers request first class and only a few passengers accept economy class, then a natural measure taken by the airline company is to cancel economy class, because the cost taken by the airline company to provide only a few economy-class services is much greater than that to provide free class upgrade for these passengers. In fact, it is very easy to guarantee the quality of all network transmission or none of the network transmission, but it is difficult to partially guarantee the quality, especially when we do not know the dividing line of the two parts. Therefore, no QoS problem will exist, so long as QoS is provided to all network services.

In its early stage, IP Internet is just like a country road, and no traffic policeman is needed in a small town with unsophisticated folkway. However, in a bustling bigalopolis, the disordered scene on some busy roads is out of control even with traffic lights and traffic policemen, and it is difficult to be on time for trips or appointments, just like today's IP Internet.

The invention is just like a highway, with no policeman or traffic light; and motor vehicles are restricted to run on specified roads via traffic lanes isolated by concrete and flyover crossings. According to the experience of the traffic bureau of California, the way to avoid highway jam is to close the entrance ramp.

The design concept of California highway has three features:
 a switch is set on the entrance ramp of the highway for controlling the macroscopic traffic flow;
 the driving speed is kept stable, thereby improving the traffic rate; and
 road isolations of a concrete structure and flyover crossings, rather than policemen and traffic lights, are employed to restrict vehicle driving.

The embodiments of the invention conform to theory of telephone networks and take three measures similar to those of the above highway:
 the traffic on each path is calculated and measured, once the traffic is to be saturated, it will be bypassed, or new users will be rejected;
 strict uniform-traffic transmission is performed, and in the embodiments of the invention, a packet loss rate of 1/1,000,000 can be attained in TV under a heavy-load traffic of 90%; and
 uplink data matching and traffic control are performed, so that it can be ensured on structure that users strictly conform to the traffic rules, because it is impossible to expect that all users autonomously take the QoS measures.

Computer files and streaming media are two kinds of distinct media foiins, and the processing modes thereof are exclusive to each other. Theory and practice of the network according to the invention disclose the following two achievements:
 a price-performance ratio that is a hundredfold of that of IP Internet;
 a method for developing high-quality symmetrical TV without interfering with the existing IP Internet service.

Especially on a large-traffic backbone network, computer files and streaming media use the same optical fiber via different wavelengths. If they must be united to a single network, for example, an access network, then the computer files should be united to a video streaming network. An embodiment of the invention provides a complete solution for transparent bearer IP Internet.

Separating streaming media and files is just the first step, it is more important to guarantee the quality of the independent streaming media network.

As described above, the PSTN telephone network employs a strict synchronization mechanism, and the network congestion phenomenon will not appear before the traffic is occupied 100 percent. Theoretically, a uniform traffic will be obtained after a plurality of uniform traffics are combined. It has been further proved by practice that under the premise of a uniform traffic, the network traffic may reach its limit value, with no packet loss phenomenon appears. Because the video media traffic, which occupies over ninety percent of the further network traffic, has the characteristics of a uniform traffic, in the present that takes video service as the main object, the approach to guaranteeing Internet QoS is of course to eliminate source traffic non-uniformity, especially to fundamentally prevent packet loss phenomenon of a network switch from appearing under a heavy load condition.

In an embodiment of the invention, a modified Ethernet is employed to establish a correction-oriented circuit, and packets with fixed length are unitedly employed network-wide. A media traffic of any bandwidth may be obtained by only changing the time interval of packet transmission. To guarantee the uniform-traffic characteristic of the network, it is required by the Internet of the invention that terminal designing must have a uniform-traffic ability. However, in the practical network environment, it cannot expect that all the users autonomously comply with the uniform-traffic specification. Therefore, in an embodiment of the invention, the node server issues a passport to the network switches, which only allows a user packet to pass uniformly under a very fine time precision. To a user terminal that is designed according to the specified requirements, the passport is totally transparent.

Under the above premise, a satisfactory result is obtained in network practice. The switch of the invention can obtain a heavy load packet loss rate less than 1/1,000,000 in the condition of a bandwidth utilization of 90%.

In conclusion, QoS is an unavoidable problem of the next generation network, and streaming media network is another species that is different from the traditional computer files. Therefore, it has no future to adapt the IP Internet to video services, and the only way out is to create a new network.

II. A novel network put forward in the invention will be introduced below.

The novel network has a network structure that is controlled centralizedly. It may be the types of tree network, star network and ring network, etc.; but on this basis, a centralized control node is needed on the network to control the whole network.

The novel network is divided into two parts: an access network and a metropolitan area network. Devices on the access network part mainly may be mainly divided into 3 categories: a node server, an access switch and a terminal (including various set-top boxes, code plates and storages, etc.). Wherein, a node server is a node on the access network that has a centralized control function, and it can control the access switch and the terminal. The node server may be directly connected with the access switch, and it may be directly connected with the terminal. Similarly, devices on the metropolitan area network part may be divided into 3 categories: a metropolitan area server, a node switch and a node server. Wherein, the node server is just the node server on the access network part, that is, the node server not only belongs to the access network part, but also belongs to the metropolitan area network part. The metropolitan area server is a node on the metropolitan area network that has a centralized control function, and it may control the node switch and the node server. The metropolitan area server may be directly connected with the node switch, or it may be directly connected with the node server. Thus it can be seen that the whole novel network has a network structure that is controlled centralizedly by layers, while the networks controlled under the node server and the metropolitan area server may have various structures, for example, tree type, star type and ring type, etc.

1. The classification of the novel network device 1.1 Device in the novel network system of the invention may be mainly divided into 3 categories: a server, a switch (including an Ethernet gateway) and a terminal (including various set-top boxes, code plates and storages, etc.). Generally, the novel network may be divided into a metropolitan area network (or state network and global network, etc.) and an access network.

1.2 Devices on the access network part may be mainly divided into 3 categories: a node server, an access switch (including an Ethernet gateway) and a terminal (including various set-top boxes, code plates and storages, etc.).

The specific hardware structure of each access network device is as follows:

Node Server:

As shown in FIG. 1, a node server mainly includes a network interface module 101, a switching engine module 102, a CPU module 103 and a disk array module 104;

Wherein, packets coming from the network interface module 101, the CPU module 103 and the disk array module 104 all enter the switching engine module 102; the switching engine module 102 performs an operation of checking the address table 105 on the packets, so that the orientation information of the packets is obtained; the packets are stored in a queue of the corresponding packet buffer 106 according to the orientation information of the packets; if the queue of the packet buffer 106 is to be full, the packets are discarded; the switching engine module 102 polls all the packet buffer queues, and forwards the queue if the following conditions are met: 1) the port sending buffer is not full; 2) the count of the packet counter in the queue is greater than 0. The disk array module 104 mainly realize the control on a hard disk, including operations of initialization, read and write, etc. on the hard disk; the CPU module 103 is mainly responsible for the protocol processing with the access switch and the terminal (not shown), the configuring of the address table 105 (including downlink protocol packet address table, uplink protocol packet address table and packet address table), and the configuring of the disk array module 104.

Figure 2:
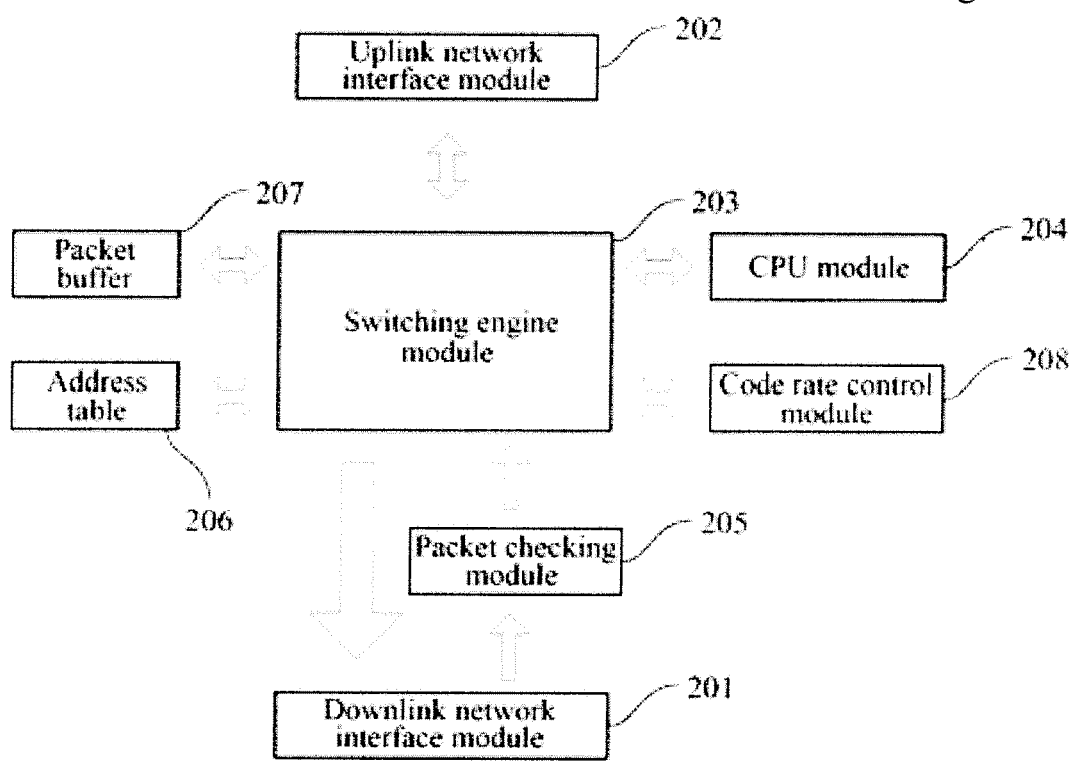
FIG. 2 shows the hardware structural representation of an access switch according to the invention.

Access Switch:

As shown in FIG. 2, the access switch mainly includes a network interface module (downlink network interface module 201 and uplink network interface module 202), a switching engine module 203 and a CPU module 204;

Wherein, packets coming from the downlink network interface module 201 (uplink data) enters the packet checking module 205; the packet checking module 205 checks whether the destination address (DA), source address (SA), packet type and packet length of the packets meet a requirement, if yes, it allocates a corresponding stream identifier (stream-id), and puts it into the switching engine module 203; otherwise, the packets are discarded. The packets coming from the uplink network interface module 202 (downlink data) enter the switching engine module 203; the packets coming from the CPU module 204 enter the switching engine module 203; the switching engine module 203 performs an operate of checking the address table 206 on the packets, so that the orientation information of the packets is obtained; if the packets entering the switching engine module 203 go from a downlink network interface to an uplink network interface, the packets are stored in a queue of the corresponding packet buffer 207 in conjunction with the stream identifier (stream-id); if the queue of the packet buffer 207 is to be full, the packets are discarded; if the packets entering the switching engine module 203 do not go from a downlink network interface to an uplink network interface, the packets are stored in a queue of the corresponding packet buffer 207 according to the orientation information of the packets; if the queue of the packet buffer 207 is to be full, the packets are discarded.

The switching engine module 203 polls all the packet buffer queues, and it is divided into two cases in the embodiments of the invention:

if the queue goes from a downlink network interface to an uplink network interface, it will be forwarded when the following conditions are met: 1) the port sending buffer is not full; 2) the count of the packet counter in the queue is greater than 0; and 3) a token generated by a code rate control module is obtained;

if the queue does not go from a downlink network interface to an uplink network interface, it will be forwarded when the following conditions are met: 1) the port sending buffer is not full; 2) the count of the packet counter in the queue is greater than 0.

The code rate control module 208 is configured by the CPU module 204, and a token is generated for all packet buffer queues that go from a downlink network interface to an uplink network interface in a programmable interval, for controlling the code rate of uplink forwarding.

The CPU module 204 is mainly responsible for the protocol processing with the node server, the configuring of the address table 206 and the configuring of the code rate control module 208.

Terminal:

The terminal mainly comprises a network interface module, a service processing module and a CPU module; for example, a set-top box mainly comprises a network interface module, a video and audio coding/decoding engine module and a CPU module; a code plate mainly comprises a network interface module, a video and audio coding engine module and a CPU module; and a storage mainly comprises a network interface module, a CPU module and a disk array module.

1.3 The device on the metropolitan area network part may be mainly divided into 2 categories: a node server, a node switch and a metropolitan area server. Wherein, the node switch mainly includes a network interface module, a switching engine module and a CPU module; the metropolitan area server mainly comprises a network interface module, a switching engine module and a CPU module.

2. The Definition of Novel Network Data Packet 2.1 The Definition of Access Network Data Packet The access network data packet mainly includes the following parts: destination address (DA), source address (SA), reserved byte, payload (PDU) and CRC.

As shown by the table below, the access network data packet mainly includes the following parts:

| DA | SA | Reserved | Payload | CRC |
---

Wherein:

Destination address (DA) is consisted of 8 bytes, wherein the first byte represents packet type (for example, protocol packet, multicast data packet and unicast data packet, etc.), and there are 256 possibilities at most; the second byte to the sixth byte represent metropolitan area network address; the seventh byte and the eighth byte represent access network address;

Source address (SA) is also consisted of 8 bytes, the definition of which is the same as that of destination address (DA);

Reserved byte is consisted of 2 bytes;

The payload part has different lengths according to different types of datagrams, if it is a protocol packet, it has a length of 64 bytes; if it is a unicast or multicast data packet, it has a length of 32+1024=1056 bytes; however, it is not limited to the above two cases;

CRC is consisted of 4 bytes, and the calculation method thereof conforms to standard Ethernet CRC algorithm.

2.2 The Definition of Metropolitan Area Network Data Packet

The topology of a metropolitan area network is a pattern type, and there are two or even more than two connections between two devices; that is, there may be more than two connection between a node switch and a node server, between a node switch and a node switch and between a node switch and a node server. However, the metropolitan area network address of a metropolitan area network device is unique. In order to accurately describe the connection relation between metropolitan area network devices, the following parameter is introduced in the embodiments of the invention: label, for uniquely describe a metropolitan area network device.

The definition of the label in this specification is similar to that of the label in Multi-Protocol Label Switch (MPLS). It is hypothesized that two connections exist between device A and device B, then a data packet will have two labels from device A to device B, and a data packet will have two labels from device B to device A, too. The label is divided into IN label and OUT label. It is hypothesized that the label of a data packet when it enters device A (IN label) is 0x0000, then the label of the data packet when it leaves device A (OUT label) will become 0x0001. The network access process on the metropolitan area network is a network access process that is controlled centralizedly, which means that the address allocation and label allocation of the metropolitan area network are both dominated by the metropolitan area server, and the node switch and the node server only execute passively. This is different from the label allocation in MPLS, wherein the label allocation in MPLS is a mutual negotiation result of the switch and the server.

As shown by the table below, a data packet on the metropolitan area network mainly includes the following parts:

| DA | SA | Reserved | Label | Payload | CRC |
|---|---|---|---|---|---|

That is, destination address (DA), source address (SA), reserved byte (Reserved), label, payload (PDU) and CRC. Wherein, for the format of label, reference may be made to the following definition: Label is consisted of 32 bits, wherein the high 16 bits are reserved, and only the low 16 bits are used; Label lies between reserved byte and payload of a data packet.

3. The Implementation of the Novel Network

The network access process of a node server and an access switch and the network access process of a node server and a terminal will be discussed below. In order to simplify the design, four types of data packets are defined on the access network, respectively:

downlink protocol packet (a protocol packet sent from a node server to an access switch or a terminal);

uplink protocol packet (a protocol packet replied by an access switch or a terminal to a node server);

unicast data packet; and multicast data packet;

A access network address is consisted of 16 bits, so the total number of access switches and terminals that can be accessed will be 65536. It is hypothesized that the datagram type of the downlink protocol packet is "1000 0000" (binary system), i.e., 0x80 (hexadecimal system), then the datagram type of the uplink protocol packet will be "0000 1000" (binary system), i.e., 0x08 (hexadecimal system), the datagram type of the unicast data packet will be "0001 0000" (binary system), i.e., 0x10 (hexadecimal system), the datagram type of the multicast data packet will be "0111 1000" (binary system), i.e., 0x78 (hexadecimal system); by combining like terms, an address table with a length of 8 bits may be mapped to an address table with a length of 2 bits, for example:

"1000 0000"=>"00", the address table of a downlink protocol packet, which is defined in the embodiments of the invention as table 0;

"0000 1000"=>"01", the address table of an uplink protocol packet, which is defined as table 1 in the embodiments of the invention;

"0001 0000"=>"10", the address table of a unicast data packet, which is defined as table 2 in the embodiments of the invention;

"0111 1000"=>"11", the address table of a multicast data packet, which is defined as table 3 in the embodiments of the invention.

In conjunction with the 16-bit access network address, in practice, it only needs four address tables of 64K=4×65536, that is, 256K. The output of the address table represents the port to which a data packet is to be oriented. For example, access switch BX-008 has 1 uplink 100 Mbps network interface, 8 downlink 100 Mbps network interfaces and 1 CPU module interface. If the 8 downlink 100 Mbps network interfaces are in turn defined as port 0 to port 7, the CPU module interface is defined as port 8, and the uplink 100 Mbps network interface is defined as port 9, then an address table of totally 256K×10 bit will be needed, for example, the output "00 0000 0001" of the address table represents port 0 to which a data packet is to be oriented, "11 0000 0000" represents port 8 and port 9 to which a data packet is to be oriented, and so on.

It is hypothesized that a data packet coming from port 9 has a destination address (DA) of 0x8056 0x1500 0x0000 0x55aa, then its packet type will be 0x80, and its access network address will be 0x55aa; according to a table lookup rule, table 0 will be looked up, that is, the address is "00 0101 0101 1010 1010", and the output of the address table corresponding to this address will be "01 0000 0000", which represents that the data packet is to be oriented to port 8.

Figure 3:
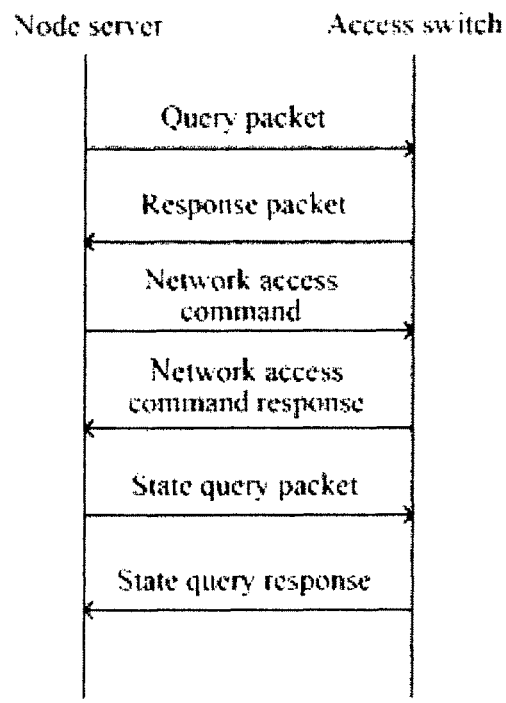
FIG. 3 is a schematic diagram showing the network access process of an access switch according to the invention.

3.1 The Network Access Process of an Access Network Device 3.1.1 The Network Access Process of an Access Switch Firstly, each access switch that is allowed to access the network must be registered on the node server, and an access switch that is not registered will be unable to access the network. As shown in FIG. 3, the process in which the access switch accesses the network relates to the following steps:

S1) A node server sends a query packet to each port, and after the access switch receives the query packet, it sends a response packet, which contains the registration information of the current access switch;

S2) After the node server receives the response packet issued by the access switch, it will know the port under which an access switch is connected, then the information of the access switch is found in an internal registration information table of the node server, a network access command is sent to the access switch (informing it of the access network address), and after the access switch receives the network access command, it accesses the network and sends a network access command response to the node server simultaneously;

S3) After the node server receives the network access command response issued by the access switch, it will know that the access switch has accessed the network, then a state query packet is sent to the port periodically to check whether the access switch works normally, and at the same, a port query packet is sent to the downlink port of the access switch to check whether other access network devices are connected under the access switch. If the current access switch works normally, it will send a state query response to the node server after receiving a device state query instruction. When no state query response is received by the node server in a certain period of time, it will be considered that the access switch has been removed from the network, and no state query packet will be sent any longer; instead, it continues to send a query packet to the current port.

Figure 4:
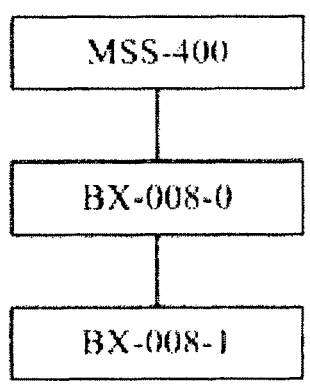
FIG. 4 is a schematic diagram showing the connection between a node server and an access switch according to the invention.

3.1.2 An Example of Interaction Between the Node Server and the Access Switch During a Network Access Process For easy description, it is hypothesized that the node server is not connected with the node switch, and the network access process on the metropolitan area network is neglected. For convenient discussion, it is hypothesized that the node server has 8 downlink 100 Mbps network interfaces in turn defined as port 0 to port 7, 1 CPU module interface defined as port 8, 1 disk array module interface defined as port 9 and 1 uplink 1000 Mbps fiber interface defined as port 10, and the type of this node server is MSS-400. As shown in FIG. 4, port 0 of MSS-400 is connected with BX-008-0, and port 1 of BX-008-0 is connected with BX-008-1.

S1) After server MSS-400 is powered on, it initializes the hardware, obtains the default metropolitan area network address (which is hypothesized as 0x00 0x0000 0x0000), and imports a configuration file from the hard disk to the CPU memory (for example, the registration information of an switch and the registration information of a terminal, etc.), and server MSS-400 configures its own access network address as 0x0000;

S2) Server MSS-400 initializes tables 0, 1, 2 and 3:
configuring table 0 as "000 0000 0000", i.e., all query packet transmission is closed;
configuring table 1 as "001 0000 0000", i.e., all response packets are to be oriented to the CPU;
configuring tables 2 and 3 as "000 0000 0000", i.e., all unicast or multicast data packet transmission is closed;

S3) Server MSS-400 knows that it has 8 downlink ports, so it configures the 8 items of table 0 respectively as:
"00 0000 0000 0000 0001"=>"000 0000 0001", i.e., a query packet with a destination address (DA) of 0x8000 0x0000 0x0000 0x0001 is oriented to port 0;
"00 0000 0000 0000 0010"=>"000 0000 0010", i.e., a query packet with a destination address (DA) of 0x8000 0x0000 0x0000 0x0002 is oriented to port 1;
"00 0000 0000 0000 0011"=>"000 0000 0100", i.e., a query packet with a destination address (DA) of 0x8000 0x0000 0x0000 0x0003 is oriented to port 2;
"00 0000 0000 0000 0100"=>"000 0000 1000", i.e., a query packet with a destination address (DA) of 0x8000 0x0000 0x0000 0x0004 is oriented to port 3;
"00 0000 0000 0000 0101"=>"000 0001 0000", i.e., a query packet with a destination address (DA) of 0x8000 0x0000 0x0000 0x0005 is oriented to port 4;
"00 0000 0000 0000 0110"=>"000 0010 0000", i.e., a query packet with a destination address (DA) of 0x8000 0x0000 0x0000 0x0006 is oriented to port 5;
"00 0000 0000 0000 0111"=>"000 0100 0000", i.e., a query packet with a destination address (DA) of 0x8000 0x0000 0x0000 0x0007 is oriented to port 6;
"00 0000 0000 0000 1000"=>"000 1000 0000", i.e., a query packet with a destination address (DA) of 0x8000 0x0000 0x0000 0x0008 is oriented to port 7;

S4) Server MSS-400 sends query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x0000 0x0000 0x0007 and 0x8000 0x0000 0x0000 0x0008 (with an SA of 0x0000 0x0000 0x0000 0x0000), and according to the configuration of table 0, the query packets will be in turn oriented to ports 0 to 7;

S5) After switches BX-008-0 and BX-008-1 are powered on, they initializes the hardware:
configuring table 0 "00 xxxx xxxx xxxx xxxx" as "01 0000 0000", i.e., all query packets are oriented to the CPU;
configuring table 1 "01 xxxx xxxx xxxx xxxx" as "10 0000 0000", i.e., all response packets are oriented to an uplink 100 Mbps network interface;
configuring tables 2 and 3 as "000 0000 0000", i.e., all unicast or multicast data packet transmission is closed;

S6) After switch BX-008-0 receives a query packet, it receives the query packet to its CPU module according to the configuration of its table 0, and the CPU resolves the query packet and generates a response packet (which contains the registration information of the current switch), and sends it to server MSS-400, wherein the DA of the response packet is 0x0800 0x0000 0x0000 0x0000, and the SA is 0x0000 0x0000 0x0000 0x0001;

S7) After server MSS-400 receives the response packet issued by switch BX-008-0, it will know that port 0 thereof is connected with an access switch by contrasting the source address (SA) of the response packet to the device type, then the information of the access switch is found in an internal registration information table of the node server, and a network access command is sent to the access switch (informing that the access network address thereof is 0x0001);

S8) After switch BX-008-0 receives the network access command and knows that its own access network address is 0x0001, it accesses the network, then its table 0 "00 0000 0000 0000 0001" is configured as "01 0000 0000", and the remaining items of table 0 are configured as "00 0000 0000", that is, only the downlink protocol packet of the current switch is imported to the CPU; at the same time, a network access command response (network access command response packet) is sent to server MSS-400;

S9) After server MSS-400 receives the network access command response issued by switch BX-008-0, it will know that switch BX-008-0 has accessed the network, and then a device state query instruction is sent to the port each second to check whether switch BX-008-0 works normally; and at the same, a port downlink protocol packet is sent to the downlink port of switch BX-008-0 to check whether other access network devices are connected under the current access switch. In such a case, the following configurations will be done by server MSS-400 in its table 0:
"00 0000 0000 0000 1001"=>"000 0000 0001", i.e., a port downlink protocol packet with a destination address (DA) of 0x8000 0x0000 0x0000 0x0009 is oriented to port 0;
"00 0000 0000 0000 1010"=>"000 0000 0001", i.e., a port downlink protocol packet with a destination address (DA) of 0x8000 0x0000 0x0000 0x000a is oriented to port 0;
"00 0000 0000 0000 1011"=>"000 0000 0001", i.e., a port downlink protocol packet with a destination address (DA) of 0x8000 0x0000 0x0000 0x000b is oriented to port 0;
"00 0000 0000 0000 1100"=>"000 0000 0001", i.e., a port downlink protocol packet with a destination address (DA) of 0x8000 0x0000 0x0000 0x000c is oriented to port 0;

"00 0000 0000 0000 1101"=>"000 0000 0001", i.e., a port downlink protocol packet with a destination address (DA) of 0x8000 0x0000 0x0000 0x000d is oriented to port 0;

"00 0000 0000 0000 1110"=>"000 0000 0001", i.e., a port downlink protocol packet with a destination address (DA) of 0x8000 0x0000 0x0000 0x000e is oriented to port 0;

"00 0000 0000 0000 1111"=>"000 0000 0001", i.e., a port downlink protocol packet with a destination address (DA) of 0x8000 0x0000 0x0000 0x000f is oriented to port 0;

"00 0000 0000 0001 0000"=>"000 0000 0001", i.e., a port downlink protocol packet with a destination address (DA) of 0x8000 0x0000 0x0000 0x0010 is oriented to port 0;

Server MSS-400 will notify change BX-008-0 to perform the following configurations in its table 0 via a port allocation packet containing port allocation information:

"00 0000 0000 0000 1001"=>"00 0000 0001", i.e., a port downlink protocol packet with a destination address (DA) of 0x8000 0x0000 0x0000 0x0009 is oriented to port 0;

"00 0000 0000 0000 1010"=>"00 0000 0010", i.e., a port downlink protocol packet with a destination address (DA) of 0x8000 0x0000 0x0000 0x000a is oriented to port 1;

"00 0000 0000 0000 1011"=>"00 0000 0100", i.e., a port downlink protocol packet with a destination address (DA) of 0x8000 0x0000 0x0000 0x000b is oriented to port 2;

"00 0000 0000 0000 1100"=>"00 0000 1000", i.e., a port downlink protocol packet with a destination address (DA) of 0x8000 0x0000 0x0000 0x000c is oriented to port 3;

"00 0000 0000 0000 1101"=>"00 0001 0000", i.e., a port downlink protocol packet with a destination address (DA) of 0x8000 0x0000 0x0000 0x000d is oriented to port 4;

"00 0000 0000 0000 1110"=>"00 0010 0000", i.e., a port downlink protocol packet with a destination address (DA) of 0x8000 0x0000 0x0000 0x000e is oriented to port 5;

"00 0000 0000 0000 1111"=>"00 0100 0000", i.e., a port downlink protocol packet with a destination address (DA) of 0x8000 0x0000 0x0000 0x000f is oriented to port 6;

"00 0000 0000 0001 0000"=>"00 1000 0000", i.e., a port downlink protocol packet with a destination address (DA) of 0x8000 0x0000 0x0000 0x0010 is oriented to port 7;

S10) Server MSS-400 sends port downlink protocol packets with destination addresses (DA) of 0x8000 0x0000 0x0000 0x0009, 0x8000 0x0000 0x0000 0x000a, 0x8000 0x0000 0x0000 0x000b, 0x8000 0x0000 0x0000 0x000c, 0x8000 0x0000 0x0000 0x000d, 0x8000 0x0000 0x0000 0x000e, 0x8000 0x0000 0x0000 0x000f and 0x8000 0x0000 0x0000 0x0010 (with an SA of 0x0000 0x0000 0x0000 0x0000), and according to the configuration of table 0 on server MSS-400, the port downlink protocol packets will be in turn oriented to port 0 of server MSS-400; and the port downlink protocol packets will be in turn oriented to ports 0 to 7 of switch BX-008-0 according to the configuration of table 0 on switch BX-008-0;

S11) After switch BX-008-1 receives a port downlink protocol packet (i.e., a port downlink protocol packet with a destination address of 0x8000 0x0000 0x0000 0x000a) from port 1 of switch BX-008-0, it sends a port uplink protocol packet (which contains the registration information of the current switch), wherein DA of the packet is 0x0800 0x0000 0x0000 0x0000, and SA is 0x0000 0x0000 0x0000 0x000a;

S12) After server MSS-400 receives the port uplink protocol packet issued by switch BX-008-1 and contrasts the source address (SA) of the uplink protocol packet and the device type, it will know that port 1 of BX-008-0 is connected with an access switch, and then the information of the switch is found in the internal registration information table of the server, and a network access command is sent to the access switch (informing that the access network address thereof is 0x000a);

S13) After switch BX-008-1 receives the network access command and knows that its own access network address is 0x000a, it accesses the network, then its table 0 "00 0000 0000 0000 1010" is configured as "01 0000 0000", and the remaining items of table 0 are configured as "00 0000 0000", that is, only the downlink protocol packet of the current switch is imported to the CPU; and at the same time, a network access command response is sent to the server;

S14) After server MSS-400 receives the network access command response issued by the switch, it will know that switch BX-008-1 has accessed the network, and then a device state query instruction is sent to the port each second to check whether switch BX-008-1 works normally; and at the same, a port downlink protocol packet is sent to the downlink port of switch BX-008-1 to check whether other access network devices are connected under the current access switch. If the current access switch works normally, it will send a state query response to the server after receiving a device state query instruction. When the server does not receive a state query response in 6 seconds, it will be considered that the access switch has been removed from the network, and no device state query instruction will be sent any longer; instead, it continues to send a query packet to the current port.

3.1.3 The Network Access Process of a Terminal

Figure 5:
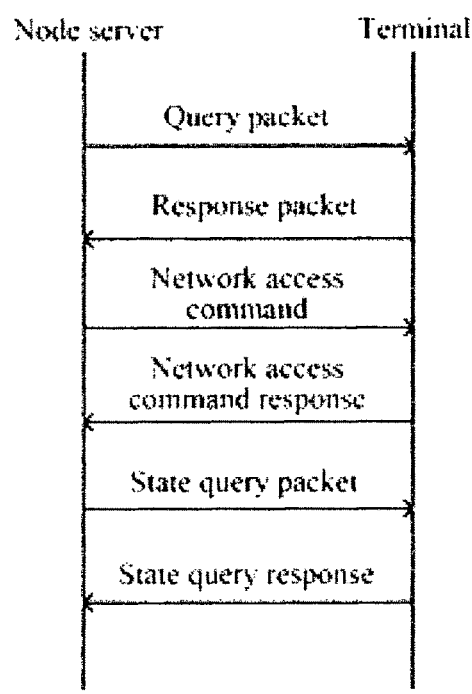
FIG. 5 is a schematic diagram showing the network access process of a terminal according to the invention.

Firstly, each terminal that is allowed to access the network must be registered on the node server, and a terminal that is not registered will be unable to access the network. As shown in FIG. 5, the process in which a terminal accesses the network relates to the following steps:

S1) A node server sends a query packet to each port, and after the terminal receives the query packet, it sends a response packet, which contains the registration information of a terminal;

S2) After the node server receives the response packet issued by the terminal, it will know what terminal (set-top box, code plate or storage) is connected under which port, then the information of the terminal is found in an internal registration information table of the node server, and a network access command is sent to the terminal (informing the access network address of the terminal), and after the terminal receives the network access command, it accesses the network and sends a network access command response to the node server simultaneously;

S3) After the node server receives the network access command response issued by the terminal, it will know that the current terminal has accessed the network, then a state query packet is sent to the port periodically to check whether the terminal works normally. If the terminal works normally, after it receives the state query packet, it will sends a state query response to the node server. When no state query response is received by the node server in a certain period of time, it will be considered that the current terminal has been removed from the network, and no state query packet will be sent any longer; instead, it continues to send a query packet to the current port.

3.1.4 An Example of the Interaction Between a Node Server and an Access Switch, a Terminal During a Network Access Process:

The access network address may be set as 16 bits, and all access network devices have a unique access network address (including set-top box, access switch, storage and even the node server itself). For convenient management of the access network addresses of all access network devices, an address information table may be maintained in the CPU module of the node server, the size of which is the sixteenth power of two, i.e., 64K, and each item of the table is consisted as follows:

1) address occupation descriptor: "00" represents that the address is not used, "01" represents that the address is standby (the node server uses the address to issue a port downlink protocol packet, but no network access uplink protocol packet is received), and "10" represents that the address is used (which is set after the node server receives a network access uplink protocol packet);

2) device descriptor: for example, "000000" represents node server, "000001" represents access switch BX-008, "000010" represents a storage, and "000011" represents a terminal;

3) device resource description information: for example, the access network address of a device connected with its network port and the uplink and downlink traffic count of each of its network ports, if the device is an access switch; the access network address of a device connected with its network port and the uplink, the count of its read and write channels and uplink and downlink traffic count of its network port, if the device is a storage; and so on. All the information is used to provide a decision-making foundation to the service process, and the information will be modified during each service process.

Figure 6:
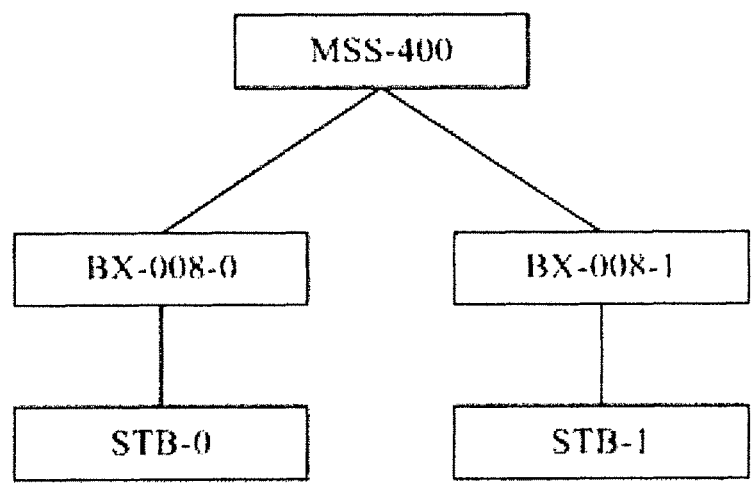
FIG. 6 is a schematic diagram showing the connection among a node server, an access switch and a terminal according to the invention.

As shown in FIG. 6, it is hypothesized that there exists a node server MSS-400, port 0 thereof is connected with an access switch BX-008-0, port 1 thereof is connected with an access switch BX-008-1, and port 0 of BX-008-0 is connected with a set-top box STB-0, port 1 of BX__008-1 is connected with a set-top box STB-1.

S1) After server MSS-400 is powered on, it initializes the hardware, obtains the default metropolitan area network address (which is hypothesized as 0x00 0x0000 0x0000), and imports a configuration file from the hard disk to the CPU memory (for example, the registration information of an switch and the registration information of a terminal, etc.), server MSS-400 initializes the address information table and clears all items (which represents that no address is used), and server MSS-400 configures its own access network address as 0x0000, that is, item 0x0000 of the address information table is configured as follows:
    address occupation descriptor: "10" represents that the address is used;
    device descriptor: "000000" represents node server;
    device resource description information: the node server has 8 downlink 100 Mbps network interfaces in turn defined as port 0 to port 7, 1 CPU module interface defined as port 8, 1 disk array interface defined as port 9 and 1 uplink 1000 Mbps fiber interface defined as port 10, and the type of this node server is MSS-400, the access network address of a device connected with its network port is not allocated, and downlink traffic count of each of its network ports is 0;

the next available address of the address information table is 0x0001;

S2) Server MSS-400 initializes tables 0, 1, 2 and 3:
    configuring table 0 as "000 0000 0000", i.e., the transmission of all downlink protocol packets is closed;
    configuring table 1 as "001 0000 0000", i.e., all uplink protocol packets are oriented to the CPU;
    configuring tables 2 and 3 as "000 0000 0000", i.e., all unicast or multicast data packet transmission is closed;

S3) Server MSS-400 knows that it has 8 downlink ports and the next available address is 0x0001, so it configures the 8 items of table 0 respectively as:
    "00 0000 0000 0000 0001"=>"000 0000 0001", i.e., a query packet with a destination address (DA) of 0x8000 0x0000 0x0000 0x0001 is oriented to port 0;
    "00 0000 0000 0000 0010"=>"000 0000 0010", i.e., a query packet with a destination address (DA) of 0x8000 0x0000 0x0000 0x0002 is oriented to port 1;
    "00 0000 0000 0000 0011"=>"000 0000 0100", i.e., a query packet with a destination address (DA) of 0x8000 0x0000 0x0000 0x0003 is oriented to port 2;
    "00 0000 0000 0000 0100"=>"000 0000 1000", i.e., a query packet with a destination address (DA) of 0x8000 0x0000 0x0000 0x0004 is oriented to port 3;
    "00 0000 0000 0000 0101"=>"000 0001 0000", i.e., a query packet with a destination address (DA) of 0x8000 0x0000 0x0000 0x0005 is oriented to port 4;
    "00 0000 0000 0000 0110"=>"000 0010 0000", i.e., a query packet with a destination address (DA) of 0x8000 0x0000 0x0000 0x0006 is oriented to port 5;
    "00 0000 0000 0000 0111"=>"000 0100 0000", i.e., a query packet with a destination address (DA) of 0x8000 0x0000 0x0000 0x0007 is oriented to port 6;
    "00 0000 0000 0000 1000"=>"000 1000 0000", i.e., a query packet with a destination address (DA) of 0x8000 0x0000 0x0000 0x0008 is oriented to port 7;

S4) Server MSS-400 sends query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x0000 0x0000 0x0007, 0x8000 0x0000 0x0000 0x0008 (with an SA of 0x0000 0x0000 0x0000 0x0000), and according to the configuration of its table 0, the query packets will be in turn oriented to ports 0 to 7; at this point, items 0x0001 to 0x0008 of the address information table are configured as:
    address occupation descriptor: "01" represents that the address is standby;
    device descriptor: it will not be modified;
    device resource description information: it will not be modified;

The next available address of the address information table is 0x0009;

S5) After switches BX-008-0 and BX-008-1 are powered on, they initializes the hardware:
    configuring its table 0 "00 xxxx xxxx xxxx xxxx" as "01 0000 0000", i.e., all downlink protocol packets are oriented to the CPU;
    configuring its table 1 "01 xxxx xxxx xxxx xxxx" as "10 0000 0000", i.e., all uplink protocol packets are oriented to the uplink 100 Mbps network interface;
    configuring its tables 2 and 3 as "00 0000 0000", i.e., all unicast or multicast data packet transmission is closed;

S6) After switch BX-008-0 receives a query packet, it receives the query packet to its CPU module according to the configuration of its table 0, the CPU module resolves the query packet and generates a response packet (which contains the registration information of the current access switch) and sends it to server MSS-400, wherein DA of the packet is 0x0800 0x0000 0x0000 0x0000, and SA is 0x0000 0x0000 0x0000 0x0001;

S7) After server MSS-400 receives the response packet issued by switch BX-008-0 and contrasts the source address (SA) of the response packet and the device type, it will know that its port 0 is connected with an access switch, then the information of the access switch is found in an internal registration information table of the node server, and a network access command is sent to the access switch (informing that the access network address thereof is 0x0001);

S8) After switch BX-008-0 receives the network access command and knows that its own access network address is 0x0001, it accesses the network, then its table 0 "00 0000 0000 0000 0001" is configured as "01 0000 0000", and the remaining items of table 0 are configured as "00 0000 0000", that is, only the downlink protocol packet of the current switch is imported to the CPU; and at the same time, a network access command response is sent to the server;

S9) After server MSS-400 receives the network access command response issued by switch BX-008-0, it will know that switch BX-008-0 has accessed the network, then item 0x0001 of the internal address information table of the server is configured as:
- address occupation descriptor: "10" represents that the address is used;
- device descriptor: "000001" represents an access switch BX-008;
- device resource description information: the access switch has 8 downlink 100 Mbps network interfaces defined in turn as port 0 to port 7, 1 CPU module interface defined as port 8 and 1 uplink 100 Mbps network interface defined as port 9, the type of the access switch is BX-008, the access network address of the device connected with its uplink network port is 0x0000 (i.e., MSS-400), the access network address of the device connected with the downlink network port is not allocated, and downlink traffic count of each of its network ports is 0;

then, a device state query instruction is sent to the port each second to check whether switch BX-008-0 works normally; and at the same, a port downlink protocol packet is sent to the downlink port of switch BX-008-0 to check whether other access network devices are connected under the current access switch. In such a case, the following configurations will be done by server MSS-400 in its table 0:
- "00 0000 0000 0000 1001"=>"000 0000 0001", i.e., a port downlink protocol packet with a destination address (DA) of 0x8000 0x0000 0x0000 0x0009 is oriented to port 0;
- "00 0000 0000 0000 1010"=>"000 0000 0001", i.e., a port downlink protocol packet with a destination address (DA) of 0x8000 0x0000 0x0000 0x000a is oriented to port 0;
- "00 0000 0000 0000 1011"=>"000 0000 0001", i.e., a port downlink protocol packet with a destination address (DA) of 0x8000 0x0000 0x0000 0x000b is oriented to port 0;
- "00 0000 0000 0000 1100"=>"000 0000 0001", i.e., a port downlink protocol packet with a destination address (DA) of 0x8000 0x0000 0x0000 0x000c is oriented to port 0;
- "00 0000 0000 0000 1101"=>"000 0000 0001", i.e., a port downlink protocol packet with a destination address (DA) of 0x8000 0x0000 0x0000 0x000d is oriented to port 0;
- "00 0000 0000 0000 1110"=>"000 0000 0001", i.e., a port downlink protocol packet with a destination address (DA) of 0x8000 0x0000 0x0000 0x000e is oriented to port 0;
- "00 0000 0000 0000 1111"=>"000 0000 0001", i.e., a port downlink protocol packet with a destination address (DA) of 0x8000 0x0000 0x0000 0x000f is oriented to port 0;
- "00 0000 0000 0001 0000"=>"000 0000 0001", i.e., a port downlink protocol packet with a destination address (DA) of 0x8000 0x0000 0x0000 0x0010 is oriented to port 0;

Server MSS-400 will notify change BX-008-0 to perform the following configurations in its table 0 via a port allocation packet containing port allocation information:
- "00 0000 0000 0000 1001"=>"00 0000 0001", i.e., a port downlink protocol packet with a destination address (DA) of 0x8000 0x0000 0x0000 0x0009 is oriented to port 0;
- "00 0000 0000 0000 1010"=>"00 0000 0010", i.e., a port downlink protocol packet with a destination address (DA) of 0x8000 0x0000 0x0000 0x000a is oriented to port 1;
- "00 0000 0000 0000 1011"=>"00 0000 0100", i.e., a port downlink protocol packet with a destination address (DA) of 0x8000 0x0000 0x0000 0x000b is oriented to port 2;
- "00 0000 0000 0000 1100"=>"00 0000 1000", i.e., a port downlink protocol packet with a destination address (DA) of 0x8000 0x0000 0x0000 0x000c is oriented to port 3;
- "00 0000 0000 0000 1101"=>"00 0001 0000", i.e., a port downlink protocol packet with a destination address (DA) of 0x8000 0x0000 0x0000 0x000d is oriented to port 4;
- "00 0000 0000 0000 1110"=>"00 0010 0000", i.e., a port downlink protocol packet with a destination address (DA) of 0x8000 0x0000 0x0000 0x000e is oriented to port 5;
- "00 0000 0000 0000 1111"=>"00 0100 0000", i.e., a port downlink protocol packet with a destination address (DA) of 0x8000 0x0000 0x0000 0x000f is oriented to port 6;
- "00 0000 0000 0001 0000"=>"00 1000 0000", i.e., a port downlink protocol packet with a destination address (DA) of 0x8000 0x0000 0x0000 0x0010 is oriented to port 7;

S10) Server MSS-400 sends port downlink protocol packets with destination addresses (DA) of 0x8000 0x0000 0x0000 0x0009, 0x8000 0x0000 0x0000 0x000a, 0x8000 0x0000 0x0000 0x000b, 0x8000 0x0000 0x0000 0x000c, 0x8000 0x0000 0x0000 0x000d, 0x8000 0x0000 0x0000 0x000e, 0x8000 0x0000 0x0000 0x000f, 0x8000 0x0000 0x0000 0x0010 (with an SA of 0x0000 0x0000 0x0000 0x0000), and according to the configuration of table 0 on server MSS-400, the port downlink protocol packets will be in turn oriented to port 0 of server MSS-400; the port downlink protocol packets will be in turn oriented to ports 0 to 7 of switch BX-008-0 according to the configuration of table 0 on switch BX-008-0; moreover, items 0x0009 to 0x0010 of the address information table on server MSS-400 are configured as:
- address occupation descriptor: "01" represents that the address is standby;
- device descriptor: it will not be modified;

device resource description information: it will not be modified;

The next available address is 0x0011;

S11) After STB-0 receives a port downlink protocol packet from port 0 of switch BX-008-0 (i.e., a port downlink protocol packet with a destination address of 0x8000 0x0000 0x0000 0x0009), it sends a port uplink protocol packet (which contains the registration information of the current terminal), wherein DA of the packet is 0x0800 0x0000 0x0000 0x0000, and SA is 0x0000 0x0000 0x0000 0x0009 (port 0 of the switch);

S12) After server MSS-400 receives the port uplink protocol packet issued by switch STB-0 and contrasts the source address (SA) of the uplink protocol packet and the device type, it will know that port 0 of BX-008-0 is connected with a terminal, then the terminal information is found in the internal registration information table of the server, and a network access command is sent to the terminal (informing that the access network address of the terminal is 0x0009);

S13) After STB-0 receives the network access command and knows that its own access network address is 0x0009, it accesses the network and sends a network access command response to the server simultaneously;

S14) After server MSS-400 receives the network access command response issued by STB-0, it will know that switch STB-0 has accessed the network, then item 0x0009 of the address information table is configured as:
  address occupation descriptor: "10" represents that the address is used;
  device descriptor: "000011" represents a terminal;
  device resource description information: the terminal has a video and audio coding/decoding engine and a 100 Mbps network interface, the type of the terminal is STB, the access network address of a device connected with its network port is 0x0001 (i.e., BX-008-0), and the downlink traffic count of its network port is 0;

Item 0x0001 of the address information table is configured as:
  address occupation descriptor: it will not be modified;
  device descriptor: it will not be modified;
  device resource description information: the access switch has 8 downlink 100 Mbps network interfaces defined in turn as port 0 to port 7, 1 CPU module interface defined as port 8 and 1 uplink 100 Mbps network interface defined as port 9, the type of the access switch is BX-008, the access network address of the device connected with its uplink network port is 0x0000 (i.e., MSS-400), the access network address of the device connected with the downlink network port 0 is 0x0009, the rest is not allocated, and downlink traffic count of each of its network ports is 0;

Then, server MSS-400 sends a device state query instruction to the port each second to check whether STB-0 works normally, when the server does not receive a state query response in 6 seconds, it will be considered that STB-0 has been removed from the network, and no device state query instruction will be sent any longer; instead, it continues to send a query packet to the current port.

Referring to the above steps S6-S14, BX-008-1 may also access the network and obtain its access network address as 0x0002; and STB-1 may also access the network and obtain its access network address as 0x0012.

3.1.5 The Definition of Data Format During the Network Access Process of an Access Network Device:

The information interaction mode between the user terminal and the server is PDU, and both use Raw Socket to transfer PDU, the data format of which is as follows:

| Destination Address | Source Address | Reserved Byte | PDU |
|---|---|---|---|
| 4W | 4W | 2BYTE | 32W or 528W |

Definition of System Message (PDU)

I) Port Query

1) Port Query Instruction: a 32W Short Signaling Issued by a Server

| Field Number | Length | Code | Description |
|---|---|---|---|
| 0 | 1W | 8A01 | server port query instruction |
| 1-4 | 4W | | network address |
| 5-7 | 3W | | system clock |
| 8-9 | 2W | | IP address of a gateway (this field is valid only for a terminal) |
| 10-12 | 3W | | MAC address of a gateway (this field is valid only for a terminal) |
| 13-31 | 19W | 0000 | padded |

2) Port Query Response Instruction: a 32W Short Signaling

A response sent by a set-top box to a server after reception of 8A01

| Field Number | Length | Code | Description |
|---|---|---|---|
| 0 | 1W | 8A03 | user terminal port query response instruction |
| 1 | 1W | | device type (0x2131) |
| 2-4 | 3W | | terminal device identification (different for each terminal) |
| 5-8 | 4W | | network address (acquired from 8A01) |
| 9-11 | 3W | 0000 | user number (padded with 0) |
| 12 | 1W | 0000 | user extension number (padded with 0) |
| 13-15 | 3W | | terminal version information (for identifying the location of a set-top box program on a server) |
| 16-31 | 16W | 0000 | padded |

A response sent by a switch to a server after reception of 8A01

| Field Number | Length | Code | Description |
|---|---|---|---|
| 0 | 1W | 8A02 | switch port query response instruction |
| 1 | 1W | | device type |
| 2-4 | 3W | | device identification (different for each switch) |
| 5-8 | 4W | | network address (acquired from 8A01) |
| 9 | 1W | | rated traffic of backbone (inherent to a switch) |
| 10 | 1W | | rated traffic of branch (inherent to a switch) |
| 11-13 | 3W | | version information (inherent to a switch) |
| 14-31 | 18W | 0000 | padded with 0 |

A response sent by a code plate to a server after reception of 8A01

| Field Number | Length | Code | Description |
|---|---|---|---|
| 0 | 1W | 8A06 | code plate port query response instruction |
| 1 | 1W | | device type (0x5131) |

-continued

| Field Number | Length | Code | Description |
|---|---|---|---|
| 2-4 | 3W | | device identification (different for each device) |
| 5-8 | 4W | | network address (acquired from 8A01) |
| 9-31 | 23W | 0000 | padded |

Device Identification: With a Temporary Value of 0x5131 0201 000X (X=0–f)

3) Network Access Instruction: a 32W short signaling issued by a server

| Field Number | Length | Code | Description |
|---|---|---|---|
| 0 | 1W | 8A11 | server network access instruction |
| 1 | 1W | | device type |
| 2-4 | 3W | | device identification |
| 5-8 | 4W | | network address |
| 9-11 | 3W | | device number, user number |
| 12 | 1W | | user extension number, or TWG-dedicated HOP NUMBER |
| 13-31 | 19W | 0000 | padded |

4) Network Access Confirmation Instruction: a 32W Short Signaling

| Field Number | Length | Code | Description |
|---|---|---|---|
| 0 | 1W | 8A12 | network access confirmation instruction |
| 1 | 1W | | device type |
| 2-4 | 3W | | device identification |
| 5-10 | 6W | | device model (auxiliary information, ASCII code) |
| 11-13 | 3W | | user number (acquired from 8A11) |
| 14 | 1W | | user extension number (acquired from 8A11) |
| 15-18 | 4W | | network address (acquired from 8A01) |
| 19-31 | 13W | 0000 | padded |

5) State Query Instruction: a 32W Short Signaling Issued by a Server

State Query Instruction to a Switch

| Field Number | Length | Code | Description |
|---|---|---|---|
| 0 | 1W | 8A21 | switch state query instruction |
| 1 | 1W | | device type |
| 2-4 | 3W | | device identification |
| 5-8 | 4W | | network address |
| 9 | 1W | | device number |
| 10-12 | 3W | | real-time clock (maintained by a server) |
| 13-17 | 5W | | padded |
| 18-19 | 2W | | IP address (valid only for a gateway) |
| 20-22 | 3W | | MAC address (valid only for a gateway) |
| 23 | 1W | | MAC serial number (valid only for a gateway) |
| 24-31 | 8W | | padded |

State Query Instruction to a Set-Top Box

| Field Number | Length | Code | Description |
|---|---|---|---|
| 0 | 1W | 8A31 | set-top box state query instruction |
| 1-4 | 4W | | network address |
| 5-7 | 3W | | real-time clock (maintained by a server) |
| 8-10 | 3W | | set-top box number |
| 11-31 | 21W | 0000 | padded |

6) State Query Response Instruction: a 32W Short Signaling

State Query Response from a Switch

| Field Number | Length | Code | Description |
|---|---|---|---|
| 0 | 1W | 8A22 | switch state query response instruction |
| 1 | 1W | | device type |
| 2-4 | 3W | | device identification |
| 5-6 | 2W | | padded |
| 7 | 1W | | device number |
| 8 | 1W | | padded |
| 9 | 1W | | working state of a switch |
| 10 | 1W | | temperature |
| 11 | 1W | | actually-measured uplink traffic of the backbone |
| 12 | 1W | | actually-measured downlink traffic of the backbone |
| 13-31 | 19W | | padded |

State Query Response from a Set-Top Box

| Field Number | Length | Code | Description |
|---|---|---|---|
| 0 | 1W | 8A23 | user terminal state query response instruction |
| 1 | 1W | | device type |
| 2-4 | 3W | | device identification |
| 5-7 | 3W | | user number |
| 8 | 1W | | user terminal extension number |
| 9 | 1W | | terminal device state (normal = 0) |
| 10 | 1W | | ambient temperature of user terminal |
| 11 | 1W | | type of a device connected to a terminal |
| 12 | 1W | | on-off state of a device connected to a terminal: 0 = powered off; 1 = powered on |
| 13-30 | 18W | | the same as 11-12 |
| 31 | 1w | | CRC |

State Query Response from a Code Plate

| Field Number | Length | Code | Description |
|---|---|---|---|
| 0 | 1W | 8A26 | code plate state query instruction response |
| 1 | 1W | | device type |
| 2-4 | 3W | | device identification |
| 5-7 | 3W | | device number |
| 8 | 1W | | padded |
| 9 | 1W | | code plate working state |
| 10 | 1W | | code plate temperature |
| 11-31 | 21W | | padded |

3.2 Network Access Process of a Node Server
3.2.1 Implementation of Metropolitan Area Network In order to simplify the design, there are 4 types of packets defined in the metropolitan area network, respectively:

metropolitan area query label packet (a protocol packet containing a label sent by a metropolitan area server to a node switch and a node server);

metropolitan area response label packet (a protocol packet containing a label replied by a node switch and a node server to a metropolitan area server);

unicast label data packet (formed by a node server by adding a label to a unicast or multicast data packet);

multicast label data packet (formed by a node server by adding a label to a unicast or multicast data packet).

The address of a metropolitan area network has a total length of 40 bit, which is divided into 3 layers here, respectively: 8 bit, 16 bit and 16 bit, which are in turn defined as state network, wide area network and metropolitan area network. The data transmission between terminals on the same metropolitan area network and on the same access network is controlled by a node server of the access network.

It is hypothesized that terminal STB_0 lies on access network A, terminal STB_1 lies on access network B, wherein access network A and access network B belong to one and the same metropolitan area network C. The implementation process is as follows:

S1) STB_0 issues a request for carrying out videophone with STB_1;

S2) A node server on access network A checks that STB_1 does not belong to access network A according to the number of STB_1, then it issues a query to a metropolitan area server on metropolitan area network C;

S3) The metropolitan area server on metropolitan area network C checks that STB_1 belongs to access network B according to the number of STB_1, and it issues a query to a node server on access network B;

S4) The node server on access network B check that STB_1 is on access network B according to the number of STB_1, and it sends a call menu to STB_1;

S5) STB_1 may select to accept or refuse, and it sends a response to the node server on access network B, it is hypothesized here that STB_1 select to accept;

S6) The node server on access network B issues a response to the metropolitan area server on metropolitan area network C;

S7) The metropolitan area server on metropolitan area network C issues a response to the node server on access network A; and S8) The node server on access network A issues a response to STB_0.

It may be known from the above description that, for the embodiments of the invention, the terminal only interacts with a node server of the local access network, and the node server interacts with a metropolitan area server of the local metropolitan area network, and so on; the metropolitan area server interacts with a wide area server on the local wide area network.

It is hypothesized that the datagram type of the metropolitan area query packet is "1001 0000" (binary system), i.e., 0x90 (hexadecimal system); the datagram type of metropolitan area response packet is "0000 1001" (binary system), i.e., 0x09 (hexadecimal system); the datagram type of the unicast label packet is "0001 0000" (binary system), i.e., 0x10 (hexadecimal system); the datagram type of the multicast label packet is "0111 1000" (binary system), i.e., 0x78 (hexadecimal system); and four look-up tables are needed, for example:

metropolitan area query label packet label look-up table, defined as table 4, with a size of 64K;

metropolitan area response label packet label look-up table, defined as table 5, with a size of 64K;

unicast label packet label look-up table, defined as table 6, with a size of 64K;

multicast label packet label look-up table, defined as table 7, with a size of 64K;

In addition to the port to which a packet is to be oriented, the output of the label look-up table for metropolitan area query label packet, metropolitan area response label packet, unicast label packet, and multicast label packet further has a 16 bit OUT label. For example, wherein, a node switch MX-4 has four 1000 Mbps fiber interfaces and one CPU module interface. If the four 1000 Mbps fiber interfaces are in turn defined as port 0 to port 3 and the CPU module interface is defined as port 4, then a 64k×21 bit (5 bit+16 bit) metropolitan area query label packet address look-up table, a 64k×21 bit (5 bit+16 bit) metropolitan area response label packet address look-up table, a 64K×21 bit (5 bit+16 bit) unicast label packet and a 64K×21 bit (5 bit+16 bit) multicast label packet will be required. For example, the output of the metropolitan area query label packet look-up table with an IN label of 0x0001 is "1 0000 0000 0000 0000 0000", which represents that the packet is oriented to port 4 (CPU port), and the OUT label is 0x0000; the output of the multicast label packet look-up table with an IN label of 0x0001 is "0 0011 0000 0011 0000 0000", which represents that the packet is oriented to port 0 and port 1, and the OUT label is 0x0300, and so on.

An example of unicast and multicast label data packet is as follows:

It is hypothesized that a data packet enters from port 0, and its header data are 0x1056 0x1500 0x0000 0x55aa 0x0056 0x1500 0001 0xaa55 0x0000 0x0000 0x00001, wherein DA is 0x1056 0x1500 0x0000 0x55aa, SA is 0x0056 0x1500 0001 0xaa55, reserved byte is 0x0000 and label is 0x0001, then its packet type will be 0x10; according to a table lookup rule, table 6 will be looked up, that is, the address is "0000 0000 0000 0001", and the output of the look-up table corresponding this address is "0 1100 1000 0000 0000 0001", which represents port 2 and port 3 to which a data packet is to be oriented, and label is replaced 0x8001; thus, when a data packet is output from port 2 and port 3, its header data will be 0x1056 0x1500 0x0000 0x55aa 0x0056 0x1500 0001 0xaa55 0x0000 0x0000 0x8001.

Communication in the metropolitan area network will be illustrated in detail below according to an embodiment of the invention, which specifically comprises a network access process and a service process of a metropolitan area server and a node switch and of a metropolitan area server and a node server.

Figure 7:
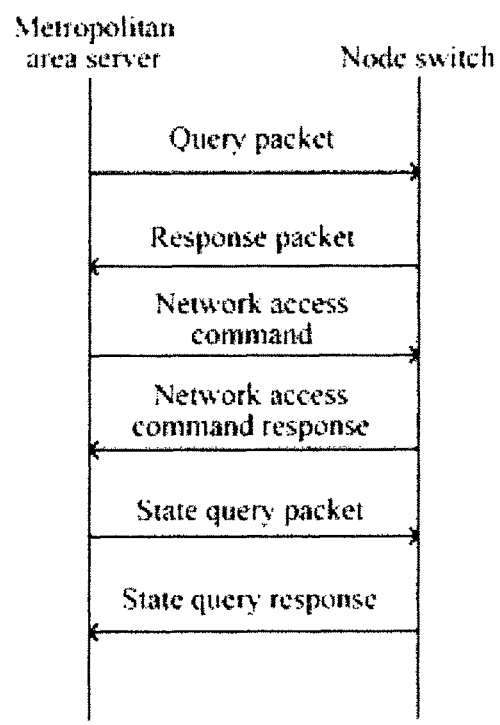
FIG. 7 is a schematic diagram showing the network access process of a node switch according to the invention.

3.2.2 The Network Access Process of a Metropolitan Area Network 3.2.2.1 The Network Access Process of a Metropolitan Area Server and a Node Switch, a Node Server Firstly, each switch that is allowed to access the network must be registered on a server, the registration information of an switch includes the device type and device identification of the switch, and an switch that is not registered will be unable to access the network. As shown in FIG. 7, the process in which the node switch accesses the network relates to the following steps:

S1) a metropolitan area server sends a query packet to each port, after a node switch receives the query packet, it sends a response packet (the response contains the device type and device identification of the switch, which is the intrinsic information of each switch);

S2) after the metropolitan area server receives the response issued by the node switch, it knows that the current port is connected with a node switch, then it finds the node switch information in an internal registration information table of the metropolitan area server, and sends a network access command to the node switch (informing the metropolitan area network address and label of the switch), and after the node switch receives the network access command, it accesses the network and sends a network access command response to the metropolitan area server at the same time;

S3) after the metropolitan area server receives the network access command response issued by the switch, it knows that the node switch has accessed the network, and then a state query packet is sent to the port each second to check whether the node switch works normally; and at the same, a port query packet is sent to other ports of the node switch to check whether other devices are connected under the node switch. If the node switch works normally, after it receives the state query packet, it will sends a state query response to the metropolitan area server. When the metropolitan area server does not receive a state query response in a certain period of time (for example, in 6 seconds), it will be considered that the node switch has been removed from the network, and no state query packet will be sent any longer; instead, it continues to send a query packet to the current port.

The network access process of a node server connected under the node switch is similar to the above process, so it will not be again described in detail here.

3.2.2.2 An Example of Network Access Interaction Between a Metropolitan Area Server and a Node Switch, a Node Server All devices on the metropolitan area network are described with a device information table, and a device may be uniquely identified by a device type of 2 bytes and a device identification of 6 bytes; generally, it will be described according to that different device types have different device information tables, for example, node switch information table and node server information table. The items of a device information table are consisted as follows:

1) device identification: 6 bytes, which is written into a hard disk or flash of a metropolitan area server when a device is registered, and imported to the CPU memory after the metropolitan area server is powered on;

2) device state: 2 bytes, wherein 0x0000 represents that the device does not access the network, and 0x0001 represents that the device is to be accessed to the network (the metropolitan area server issues a network access command packet, but no network access command response is received), 0x0002 represents that the device has accessed the network (set by the metropolitan area server after receiving a network access response packet);

3) device address: 2 bytes, the metropolitan area network address allocated to the device.

The metropolitan area network address has a length of 16 bits, all devices on the metropolitan area network have a unique metropolitan area network address (including metropolitan area server, node switch and node server). A table with a size of the sixteenth power of two, i.e., 64K, is maintained by a CPU module of the metropolitan area server, which is called metropolitan area address information table, and each item of the table is consisted as follows:

1) address occupation descriptor: 2 bytes, wherein 0x0000 represents that the address is not used, 0x0001 represents that the address is standby (the metropolitan area server issues a network access command packet by this address, but no network access command response is received), and 0x0002 represents that the address is used (set by the metropolitan area server after receiving a network access response packet);

2) device type: 2 bytes, for example, 0x0000 represents metropolitan area server MS-1000, 0x0001 represents node switch MX-4, and 0x0002 represents node server MSS-400;

3) device resource description information: several bytes, for example, if the device is a node switch, it contains the metropolitan area network address of a device connected to a network port thereof and downlink traffic count of each network port thereof; if the device is a node server, it contains the access network address of a device connected with its network port and the downlink traffic count of a network port thereof, etc.; all such information provides a decision-making foundation for the service process, and the information will be modified during each service process.

Similarly, a metropolitan area query label describes the connection from a metropolitan area server to a node switch or a node server, while a metropolitan area response label describes the connection from a node switch or a node server to a metropolitan area server. In order to simplify the design, it is hypothesized that the two has a one-to-one correspondence, for example, if the metropolitan area query label from the metropolitan area server to a node switch is 0x0008, the metropolitan area response label from the node switch to the metropolitan area server is also 0x0008; moreover, OUT label equals to IN label. Thus, another table with a size of the sixteenth power of two, i.e., 64K, is maintained by a CPU module of the metropolitan area server, which is called metropolitan area protocol label information table, and each item of the table is consisted as follows:

1) label occupation descriptor: 2 bytes, wherein 0x0000 represents that this label is not used, 0x0001 represents that this label is standby (the metropolitan area server issues a port query packet by this label, but no network access response packet is received), and 0x0002 represents that this label is used (set by the metropolitan area server after receiving a network access response packet);

2) label descriptor: 2 bytes, the metropolitan area network address of a device corresponding the label;

3) label route description information: 4 bytes, for describing the metropolitan area network address and port number of the previous-hop switch of the metropolitan area query label packet, wherein the first 2 bytes represents the metropolitan area network address of the previous-hop switch, and the last 2 bytes represents the port number of the previous-hop switch.

Figure 8:
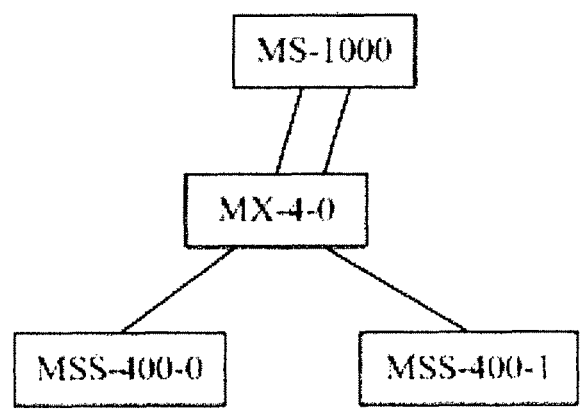
FIG. 8 is a schematic diagram showing the connection among a metropolitan area server, a node switch and a node server.

As shown in FIG. 8, for example, it is hypothesized that the metropolitan area server has four 1000 Mbps fiber interfaces and one CPU module interface. If the four 1000 Mbps fiber interfaces are in turn defined as port 0 to port 3 and the CPU module interface is defined as port 4, the type of the metropolitan area server will be MS-1000, and port 0 and port 1 of MS-1000 are respectively connected with port 2 and port 3 of MX-4-0, and port 0 of MX-4-0 is connected with MSS-400-0, and port 1 of MSS-400-0 is connected with MSS-400-1.

The network access interaction process is as follows:

S1) After server MS-1000 is powered on, it initializes the hardware and imports a configuration file from the hard disk to the CPU memory (for example, the registration information of a node switch and the registration information of a node server, etc.), server MS-1000 initializes the metropolitan area address information table and the metropolitan area protocol label information table, and all the items are cleared (which represents that all addresses and labels are not used), and server MS-1000 configures its own metropolitan area network address as 0x0000, that is, item 0x0000 of the metropolitan area address information table is configured as follows:

address occupation descriptor: 0x0002 represents that the address is used;

device descriptor: 0x0000 represents metropolitan area server;

device resource description information: the metropolitan area server has four 1000 Mbps fiber interfaces, which are in turn defined as port 0 to port 3, and the CPU module interface is defined as port 4, the type of this node server is MS-1000, the metropolitan area network address of a device connected to a network port thereof is not allocated, and downlink traffic count of each of its network ports is 0;

The next available address is 0x0001, and the next metropolitan area protocol label is 0x0000;

S2) Server MS-1000 initializes tables 4, 5, 6 and 7;

configuring table 4 as "0 0000 0000 0000 0000 0000" to "0 0000 1111 1111 1111 1111", i.e., the transmission of all metropolitan area query label packets is shut down;

configuring table 5 as "1 0000 0000 0000 0000 0000" to "1 0000 1111 1111 1111 1111", i.e., all metropolitan area response label packets are oriented to the CPU;

configuring tables 6 and 7 as "0 0000 0000 0000 0000 0000", i.e., the transmission of all unicast or multicast data packets is closed;

S3) Server MS-1000 knows that it has four 1000 Mbps fiber interfaces and the next metropolitan area protocol label is 0x0000, so it configures the 4 items of table 4 as, respectively:

"100 0000 0000 0000 0000"=>"0 0001 0000 0000 0000 0000", i.e., a query packet with a metropolitan area protocol label of 0x0000 is oriented to port 0;

"100 0000 0000 0000 0001"=>"0 0010 0000 0000 0000 0001", i.e., a query packet with a metropolitan area protocol label of 0x0001 is oriented to port 1;

"100 0000 0000 0000 0010"=>"0 0100 0000 0000 0000 0010", i.e., a query packet with a metropolitan area protocol label of 0x0002 is oriented to port 2;

"100 0000 0000 0000 0011"=>"0 1000 0000 0000 0000 0011", i.e., a query packet with a metropolitan area protocol label of 0x0003 is oriented to port 3;

The next metropolitan area protocol label is 0x0004;

S4) Server MS-1000 issues port query packets with a header information of 0x9000 0x0000 0x0000 0x0000 0x0000 0x0000 0x0000 0x0000 0x0000 0x0000 0x0000, 0x9000 0x0000 0x0000 0x0000 0x0000 0x0000 0x0000 0x0000 0x0000 0x0000 0x0001, 0x9000 0x0000 0x0000 0x0000 0x0000 0x0000 0x0000 0x0000 0x0000 0x0000 0x0002, 0x9000 0x0000 0x0000 0x0000 0x0000 0x0000 0x0000 0x0000 0x0000 0x0000 0x0003, and because the packets are switched according to labels, it does not matter even if the DA is the same. According to the configuration of table 4, the port query packets will be in turn oriented to port 0 to port 3;

Item 0x0000 of the label information table is configured as follows:
  label occupation descriptor: 0x0001 represents that this label is standby;
  label descriptor: it will not be modified;
  label route description information: 0x0000 (the metropolitan area network address of the previous-hop switch i.e., the metropolitan area network address of MS-1000), 0x0000 (port 0 of MS-1000).

Item 0x0001 of the label information table is configured as follows:
  label occupation descriptor: 0x0001 represents that this label is standby;
  label descriptor: it will not be modified;
  label route description information: 0x0000 (the metropolitan area network address of the previous-hop switch, i.e., the metropolitan area network address of MS-1000), 0x0001 (port 1 of MS-1000).

Item 0x0002 of the label information table is configured as follows:
  label occupation descriptor: 0x0001 represents that this label is standby;
  label descriptor: it will not be modified;
  label route description information: 0x0000 (the metropolitan area network address of the previous-hop switch, i.e., the metropolitan area network address of MS-1000), 0x0002 (port 2 of MS-1000).

Item 0x0003 of the label information table is configured as follows:
  label occupation descriptor: 0x0001 represents that this label is standby;
  label descriptor: it will not be modified;
  label route description information: 0x0000 (the metropolitan area network address of the previous-hop switch, i.e., the metropolitan area network address of MS-1000), 0x0003 (port 3 of MS-1000).

The next available label is 0x0004;

S5) After switch MX-4-0 is powered on, it initializes the hardware:
  configuring table 4 as "1 0000 0000 0000 0000 0000" to "1 0000 1111 1111 1111 1111", i.e., all metropolitan area query label packets are oriented to the CPU;
  configuring table 5 as "0 0000 0000 0000 0000 0000" to "0 0000 1111 1111 1111 1111", i.e., the transmission of all metropolitan area response label packets is shut down;
  configuring tables 6 and 7 as "0 0000 0000 0000 0000 0000", i.e., the transmission of all unicast or multicast data packets is closed;

S6) Port 2 of switch MX-4-0 receives a query packet with a metropolitan area protocol label of 0x0000 according to the topological graph, then:
  configuring table 5 "101 0000 0000 0000 0000"=>"0 0100 0000 0000 0000 0000", i.e., a response packet with a metropolitan area protocol label of 0x0000 is oriented to port 2;

Port 3 of switch MX-4-0 receives a query packet with a metropolitan area protocol label of 0x0001 according to the topological graph, then:
  configuring table 5 "101 0000 0000 0000 0001"=>"0 1000 0000 0000 0000 0000", i.e., a response packet with a metropolitan area protocol label of 0x0001 is oriented to port 3;

Two response packets (which contains the device type and device identification of the current switch and the port number that receives the query packet) are sent, wherein the header of one packet is 0x0900 0x0000 0x0000 0x0000 0x0000 0x0000 0x0000 0x0000 0x0000 0x0000 0x0000, and at the same time, it marks in the packet that the port number receiving the query packet is port 2;

The header of the other packet is 0x0900 0x0000 0x0000 0x0000 0x0000 0x0000 0x0000 0x0000 0x0000 0x0000 0x0001, and at the same time, it marks in the packet that the port number receiving the query packet is port 3;

S7) After port 0 of server MS-1000 receives a query response packet with a metropolitan area protocol label of 0x0000, 1) according to the device type in the response packet, server MS-1000 knows that it is a node switch, and compares the device identification in the response packet with the device identification items in the device information table on the node switch one by one, until a totally identical item is found, this indicates that the device has been registered, and it finds that the device state item is 0x0000, so it knows that the device does not access the network;

2) it checks item 0x0000 of the metropolitan area protocol label information table according to the metropolitan area protocol label 0x0000 in the response packet, and knows that the previous-hop switch is server MS-1000 (with an address of 0x0000), and the port number is port 0;

3) according to field number 5 in the response packet PDU (which indicates the switch port number that receives the query packet), server MS-1000 knows that port 0 is connected with port 2 of an switch.

A network access command is sent (informing that the metropolitan area network address of the switch is 0x0001), the head of the packet is 0x9000 0x0000 0x0001 0x0000 0x0000 0x0000 0x0000 0x0000 0x0000 0x0000 0x0000;

Item 0x0001 of the address information table is configured as follows:
  address occupation descriptor: 0x0001 represents that the address is standby (the metropolitan area server issues a network access command packet by this address, but no network access command response is received);
  device descriptor: it will not be modified;
  device resource description information: it will not be modified;
The items of the corresponding device information table are configured as follows:
  device identification: it will not be modified;
  device state: 0x0001 represents that the device is to be accessed to the network (the metropolitan area server issues a network access command packet, but no network access command response is received);
  device address: 0x0001;

S8) After port 1 of server MS-1000 receives a query response packet with a metropolitan area protocol label of 0x0001:

1) according to the device type in the response packet, server MS-1000 knows that it is a node switch, and compares the device identification in the response packet with the device identification items in the device information table on the node switch one by one, until a totally identical item is found, this indicates that the device has been registered, and it finds that the device state item is 0x0001, so it knows that the device is to be accessed to the network;

2) according to the metropolitan area protocol label 0x0001 in the response packet, it checks item 0x0001 of the metropolitan area protocol label information table, and knows that the previous-hop switch is server MS-1000 (with an address of 0x0000), and the port number is port 1;

3) according to field number 5 in the response packet PDU (which indicates the switch port number that receives the query packet), server MS-1000 knows that port 1 is connected with port 3 of an switch.

A network access command is sent (informing that the metropolitan area network address of the switch is 0x0001), the head of the packet is 0x9000 0x0000 0x0001 0x0000 0x0000 0x0000 0x0000 0x0000 0x0000 0x0000 0x0001;

Item 0x0001 of the address information table is configured as follows:
  address occupation descriptor: 0x0001 represents that the address is standby (the metropolitan area server issues a network access command packet by this address, but no network access command response is received);
  device descriptor: it will not be modified;
  device resource description information: it will not be modified;
The items of the corresponding device information table are configured as follows:
  device identification: it will not be modified;
  device state: 0x0001 represents that the device is to be accessed to the network (the metropolitan area server issues a network access command packet, but no network access command response is received);
  device address: 0x0001;

S9) After port 2 of switch MX-4-0 receives a network access command packet with a metropolitan area protocol label of 0x0000 (the header of the packet is 0x9000 0x0000 0x0001 0x0000 0x0000 0x0000 0x0000 0x0000 0x0000 0x0000 0x0000), it compares the device type and the device identification thereof, knows that its own metropolitan area network address is 0x0001, and it accesses the network and sends a network access command response to the server at the same time, the header of the packet is 0x0900 0x0000 0x0000 0x0000 0x0000 0x0000 0x0001 0x0000 0x0000 0x0000 0x0000;

S10) After port 3 of switch MX-4-0 3 receives a network access command packet with a metropolitan area protocol label of 0x0001 (the header of the packet is 0x9000 0x0000 0x0001 0x0000 0x0000 0x0000 0x0000 0x0000 0x0000 0x0000 0x0001), it compares the device type and the device identification thereof, knows that its own metropolitan area network address is 0x0001, and it accesses the network and sends a network access command response to the server at the same time, the header of the packet is 0x0900 0x0000 0x0000 0x0000 0x0000 0x0000 0x0001 0x0000 0x0000 0x0000 0x0001;

S11) after port 0 of server MS-1000 receives a network access command response packet with a metropolitan area protocol label of 0x0000, 1) according to the metropolitan area protocol label 0x0000 in the network access command response packet, it checks the label route description information in item 0x0000 of the label information table and knows that the previous-hop switch of the switch is server MS-1000 (with an address of 0x0000), and the port number is port 0.

2) according to field number 9 in the network access command response packet PDU (which indicates the switch port number that receives the query packet), server MS-1000 knows that port 0 is connected with port 2 of an switch;

3) according to the metropolitan area address 0x0001 in the network access command response packet, it knows that the metropolitan area address of the switch is 0x0001.

It may be known that switch MX-4-0 has accessed the network by integrating 1), 2) and 3).

Item 0x0001 of the address information table is configured as follows:
  address occupation descriptor: 0x0002 represents that the address is used;
  device descriptor: 0x0001 represents node switch MX-4-0;
  device resource description information: four 1000 Mbps fiber interfaces are in turn defined as port 0 to port 3, and the CPU module interface is defined as port 4; port 2 thereof is connected with port 0 of MS-1000 with a metropolitan area address of 0x0000, the metropolitan area network address of a device connected with other network port is unknown, and downlink traffic count of each of its network ports is 0.

Item 0x0000 of the label information table is configured as follows:
  label occupation descriptor: 0x0002 represents that this label is used;
  label descriptor: 0x0000;
  label route description information: 0x0000 (the metropolitan area network address of the previous-hop switch, i.e., the metropolitan area network address of MS-1000), 0x0000 (port 0 of MS-1000).

The items of the corresponding device information table are configured as follows:
  device identification: it will not be modified;
  device state: 0x0002 represents that the device has accessed the network (the metropolitan area server issues a network access command packet, and receives a network access command response);
  device address: 0x0001.

Item 0x0000 of the metropolitan area address information table is configured as follows:
  address occupation descriptor: it will not be modified;
  device descriptor: it will not be modified;
  device resource description information: the metropolitan area server has four 1000 Mbps fiber interfaces, which are in turn defined as port 0 to port 3, and the CPU module interface is defined as port 4, the type of this node server is MS-1000, port 0 thereof is connected with port 2 of MX-4-0 with a metropolitan area address of 0x0001, the metropolitan area network address of a device connected with other network ports is not allocated, and downlink traffic count of each of its network ports is 0;

Then, it periodically (for example, each second) sends a device state query instruction to port 0, if server MS-1000 does not receive a state query response in a certain period of time (for example, 6 seconds), it will not send a device state query instruction any longer, and it continues to send a query packet to port 0.

S12) After port 1 of server MS-1000 receives a network access command response packet with a metropolitan area protocol label of 0x0001, 1) according to the metropolitan area protocol label 0x0001 in the network access command response packet, it checks the label route description information of item 0x0001 of the label information table and knows that the previous-hop switch of the switch is server MS-1000 (with an address of 0x0000), and the port number is port 1;

2) according to field number 9 in the network access command response packet PDU (which indicates the switch port number that receives the query packet), server MS-1000 knows that port 1 is connected with port 3 of an switch.

3) according to the metropolitan area address 0x0001 in the network access command response packet, it knows that the metropolitan area address of the switch is 0x0001.

It may be known that switch MX-4-0 has accessed the network by integrating 1), 2) and 3).

Item 0x0001 of the address information table is configured as follows:
  address occupation descriptor: 0x0002 represents that the address is used;
  device descriptor: 0x0001 represents node switch MX-4-0;
  device resource description information: four 1000 Mbps fiber interfaces are in turn defined as port 0 to port 3, and the CPU module interface is defined as port 4; port 2 thereof is connected with port 0 of MS-1000 with a metropolitan area address of 0x0000, and port 3 thereof is connected with port 1 of MS-1000 with a metropolitan area address of 0x0000, the metropolitan area network address of a device connected with other network port is unknown, and downlink traffic count of each of its network ports is 0.

Item 0x0001 of the label information table is configured as follows:
  label occupation descriptor: 0x0002 represents that this label is used;
  label descriptor: 0x0001;
  label route description information: 0x0000 (the metropolitan area network address of the previous-hop switch, i.e., the metropolitan area network address of MS-1000), 0x0001 (port 0 of MS-1000).

The items of the corresponding device information table are configured as follows:
  device identification: it will not be modified;
  device state: 0x0002 represents that the device has accessed the network (the metropolitan area server issues a network access command packet, and receives a network access command response);
  device address: 0x0001.

Item 0x0000 of the metropolitan area address information table is configured as follows:
  address occupation descriptor: it will not be modified;
  device descriptor: it will not be modified;
  device resource description information: the metropolitan area server has four 1000 Mbps fiber interfaces, which are in turn defined as port 0 to port 3, and the CPU module interface is defined as port 4, the type of this node server is MS-1000, port 0 thereof is connected with port 2 of MX-4-0 with a metropolitan area address of 0x0001, port 1 is connected with port 3 of MX-4-0 with a metropolitan area address of 0x0001, the metropolitan area network address of a device connected with other network ports is not allocated, and downlink traffic count of each of its network ports is 0;

Then, a device state query instruction will be sent to port 1 periodically (for example, each second), if server MS-1000 does not receive a state query response in a certain period of time (for example, 6 seconds), it will not send a device state query instruction any longer; instead, it continues to send a query packet to port 1.

S13) Server MS-1000 knows that port 0 thereof is connected with port 2 of MX-4-0 with a metropolitan area address of 0x0001, and port 1 thereof is connected with port 3 of MX-4-0, and port 0 and port 1 of MX-4-0 are unknown, the next metropolitan area protocol label is 0x0004. Therefore, it configures the 4 items of table 4 as, respectively:
  "100 0000 0000 0000 0100"=>"0 0001 0000 0000 0100", i.e., a query packet with a metropolitan area protocol label of 0x0004 is oriented to port 0;
  "100 0000 0000 0000 0101"=>"0 0001 0000 0000 0101", i.e., a query packet with a metropolitan area protocol label of 0x0005 is oriented to port 0;
  "100 0000 0000 0000 0110"=>"0 0010 0000 0000 0110", i.e., a query packet with a metropolitan area protocol label of 0x0006 is oriented to port 1;
  "100 0000 0000 0000 0111"=>"0 0010 0000 0000 0111", i.e., a query packet with a metropolitan area protocol label of 0x0007 is oriented to port 1;

The next metropolitan area protocol label is 0x0008.

By sending a packet using label 0x0000 or 0x0001, MS-1000 notifies MX-4-0 to configure the items of MX-4-0 table 4:
  "100 0000 0000 0000 0100"=>"0 0001 0000 0000 0100", i.e., a query packet with a metropolitan area protocol label of 0x0004 is oriented to port 0;
  "100 0000 0000 0000 0101"=>"0 0010 0000 0000 0101", i.e., a query packet with a metropolitan area protocol label of 0x0005 is oriented to port 1;
  "100 0000 0000 0000 0110"=>"0 0001 0000 0000 0110", i.e., a query packet with a metropolitan area protocol label of 0x0006 is oriented to port 0;
  "100 0000 0000 0000 0111"=>"0 0010 0000 0000 0111", i.e., a query packet with a metropolitan area protocol label of 0x0007 is oriented to port 1;

The items of MX-4-0 table 5 are configured as follows:
"101 0000 0000 0000 0100"=>"0 0100 0000 0000 0100", i.e., a response packet with a metropolitan area protocol label of 0x0004 is oriented to port 2;
"101 0000 0000 0000 0101"=>"0 0100 0000 0000 0101", i.e., a response packet with a metropolitan area protocol label of 0x0005 is oriented to port 2;
"101 0000 0000 0000 0110"=>"0 1000 0000 0000 0110", i.e., a response packet with a metropolitan area protocol label of 0x0006 is oriented to port 3;
"101 0000 0000 0000 0111"=>"0 1000 0000 0000 0111", i.e., a response packet with a metropolitan area protocol label of 0x0007 is oriented to port 3;

S14) Server MS-1000 issues port query packets with a header information of 0x9000 0x0000 0x0000 0x0000 0x0000 0x0000 0x0000 0x0000 0x0000 0x0000 0x0004, 0x9000 0x0000 0x0000 0x0000 0x0000 0x0000 0x0000 0x0000 0x0000 0x0000 0x0005, 0x9000 0x0000 0x0000 0x0000 0x0000 0x0000 0x0000 0x0000 0x0000 0x0000 0x0006, 0x9000 0x0000 0x0000 0x0000 0x0000 0x0000 0x0000 0x0000 0x0000 0x0000 0x0007, and because the packets are exchanged according to labels, it does not matter even if the DA is the same. According to the configuration of table 0, query packets with label 0x0004 and 0x0005 will be in turn oriented to port 0, and query packets with label 0x0006 and 0x0007 will be in turn oriented to port 1;

Item 0x0004 of the label information table is configured as follows:
label occupation descriptor: 0x0001 represents that this label is standby;
label descriptor: it will not be modified;
label route description information: 0x0001 (the metropolitan area network address of the previous-hop switch, i.e., the metropolitan area network address of MX-4-0), and 0x0000 (port 0 of MX-4-0).

Item 0x0005 of the label information table is configured as follows:
label occupation descriptor: 0x0001 represents that this label is standby;
label descriptor: it will not be modified;
label route description information: 0x0001 (the metropolitan area network address of the previous-hop switch, i.e., the metropolitan area network address of MX-4-0), and 0x0001 (port 1 of MX-4-0).

Item 0x0006 of the label information table is configured as follows:
label occupation descriptor: 0x0001 represents that this label is standby;
label descriptor: it will not be modified;
label route description information: 0x0001 (the metropolitan area network address of the previous-hop switch, i.e., the metropolitan area network address of MX-4-0), and 0x0000 (port 0 of MX-4-0).

Item 0x0007 of the label information table is configured as follows:
label occupation descriptor: 0x0001 represents that this label is standby;
label descriptor: it will not be modified;
label route description information: 0x0001 (the metropolitan area network address of the previous-hop switch, i.e., the metropolitan area network address of MX-4-0), 0x0001 (port 1 of MS-1000).

The next available label is 0x0008;

S15) After switches MSS-400-0 and MSS-400-1 are powered on, they initialize the hardware; because the node server is the initiating end or the terminating end of a label, the label thereof does not need to be replaced;

configuring table 4 as "001 0000 0000", i.e., all metropolitan area query label packets are oriented to the CPU;
configuring table 5 as "100 0000 0000", i.e., all metropolitan area response label packets are oriented to port 10 (i.e., uplink 1000 Mbps fiber interface);
configuring tables 6 and 7 as "000 0000 0000", i.e., the transmission of all unicast or multicast data packets is closed;

S16) According to the topological graph, port 10 of switch MSS-400-0 receives query packets with a metropolitan area protocol label of 0x0004 and 0x0006, then:
Two response packets are sent (which contain the device type and device identification of the current switch and the port number that receives the query packet), the header of one packet is 0x0900 0x0000 0x0000 0x0000 0x0000 0x0000 0x0000 0x0000 0x0000 0x0000 0x0004, and at the same time, it marks in the packet that the port number receiving the query packet is port 10;
The header of the other packet is 0x0900 0x0000 0x0000 0x0000 0x0000 0x0000 0x0000 0x0000 0x0000 0x0000 0x0006, and at the same time, it marks in the packet that the port number receiving the query packet is port 10;

S17) According to the topological graph, port 10 or switch MSS-400-1 receives query packets with a metropolitan area protocol label of 0x0005 and 0x0007, then:
Two response packets are sent (which contain the device type and device identification of the current switch and the port number that receives the query packet), the header of one packet is 0x0900 0x0000 0x0000 0x0000 0x0000 0x0000 0x0000 0x0000 0x0000 0x0000 0x0005, and at the same time, it marks in the packet that the port number receiving the query packet is port 10;
The header of the other packet is 0x0900 0x0000 0x0000 0x0000 0x0000 0x0000 0x0000 0x0000 0x0000 0x0000 0x0007, and at the same time, it marks in the packet that the port number receiving the query packet is port 10;

S18) Similarly, by repeating S7, S8, S9, S10, S11, S12, the two switches MSS-400 also access the network.

3.2.3 Service Process of the Metropolitan Area Network

Figure 9:
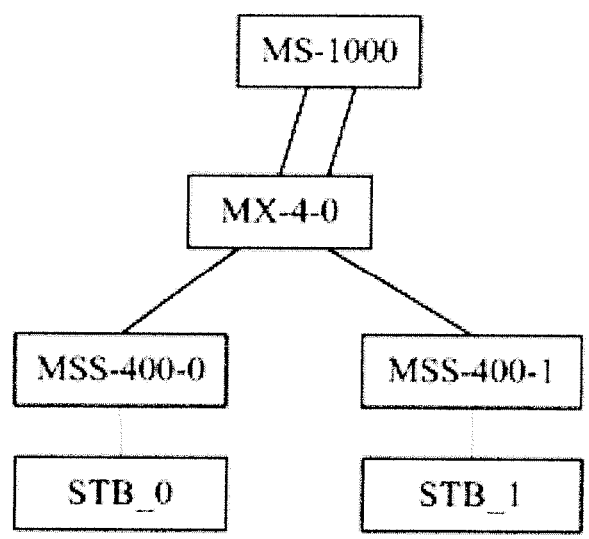
FIG. 9 is a schematic diagram showing the connection among a metropolitan area server, a node switch, a node server and a terminal.

As shown in FIG. 9, it is hypothesized that the metropolitan area server has four 1000 Mbps fiber interfaces and one CPU module interface. If the four 1000 Mbps fiber interfaces are in turn defined as port 0 to port 3 and the CPU module interface is defined as port 4, the type of the metropolitan area server is MS-1000, and port 0 and port 1 of MS-1000 are respectively connected with port 2 and port 3 of MX-4-0, and port 0 of MX-4-0 is connected with MSS-400-0, port 1 is connected with MSS-400-1.

Terminal STB_0 is connected on port 0 of MSS-400-0, terminal STB_1 is connected on port 1 of MSS-400-1, and their addresses after accessing the network are STB_0 (0x0000 0x0000 0x0002 x0009) and STB_1 (0x0000 0x0000 0x0003 0x0012), the metropolitan area network address of MX-4-0 is 0x0001; the metropolitan area protocol labels of MX-4-0 and MSS-1000 are 0x0000 and 0x0001; the metropolitan area protocol labels of MSS-400-0 and MSS-1000 are 0x0005 and 0x0007, and the metropolitan area protocol labels of MSS-400-1 and MSS-1000 are 0x0006 and 0x0008.

3.2.3.1 Service Establishing Process

STB_0 issues a request to MSS-400-0 for carrying out visual communication with STB_1, in the following steps:
S1) STB_0 issues a service request instruction packet, of which DA is 0x0800 0x0000 0x0002 0x0000, SA is 0x0000 0x0000 0x0002 0x0009, reserved is 0x0000, and PDU part refers to the appendix, and service parameter is SERVICE_TYPE_TELEPHONE_REQUEST or SERVICE_TYPE_TELEPHONE_DIRECT.

S2) According to the configuration of table 1, the service request instruction packet is oriented to MSS-400-0, and MSS-400-0 determines that a request for visual communication is received according to the content of the packet; it knows according to SA that it is STB_0 that issues the request (it is hypothesized that the bandwidth of videophone is uplink and downlink 6 Mbit/s, and there is 80 Mbit/s remaining in the uplink and downlink bandwidth of STB_0 and MSS-400-0), it checks the uplink and downlink bandwidth of STB_0 and MSS-400-0, and if they meet the service requirement, it continues to jump to S4; otherwise, it jumps to S3.

S3) MSS-400-0 sends a menu to the calling-party STB_0, which represents that the service is rejected;

A packet is sent to STB_0: DA is 0x8000 0x0000 0x0002 0x0009, SA is 0x0000 0x0000 0x0002 0x0000, reserved is 0x0000, and PDU part refers to appendix Menu Data Format.

S4) MSS-400-0 checks the CAM table (content-address mapping table) according to the called party number and knows that the called party does not exist on its own access network, so MSS-400-0 issues service request instruction packet to metropolitan area server MSS-1000, wherein DA is 0x0900 0x0000 0x0000 0x0000, SA is 0x0000 0x0000 0x0002 0x0009, reserved is 0x0000, protocol label is 0x0005 (PDU part refers to 5 Definition of Data Format in the Network Access Process of a Metropolitan Area Network), service parameter is SERVICE_TYPE_TELEPHONE_REQUEST or SERVICE_TYPE_TELEPHONE_DIRECT.

S5) MSS-1000 receives a service request packet from MSS-400-0 and determines that a request for visual communication is received according to the content of the packet; it knows according to SA that it is a terminal under MSS-400-0 (It is hypothesized that there is 800 Mbit/s remaining in the uplink and downlink bandwidth of MX-4-0 and MSS-400-0); it checks the CAM table (content-address mapping table) according to the called party number and knows that the called party is under the access network of MSS-400-1 (it is hypothesized that there is 800 Mbit/s remaining in the uplink and downlink bandwidth of MX-4-0 and MSS-400-1), and it checks the uplink and downlink bandwidth of MX-4-0 and MSS-400-0, MSS-400-1, if they meet the service requirement, it continues to jump to S7; otherwise, it jumps to S6.

S6) MSS-1000 sends a service reject packet to MSS-400-0, wherein DA is 0x9000 0x0000 0x0002 0x0009, SA is 0x0000 0x0000 0x0000 0x0000, reserved is 0x0000, protocol label is 0x0005, and PDU part is neglected; after MSS-400-0 receives the service reject packet, it jumps to 3.

S7) MSS-1000 issues a service request packet to MSS-400-1, and issues a service request instruction packet, wherein DA is 0x9000 0x0000 0x0003 0x0012, SA is 0x0000 0x0000 0x0000 0x0000, reserved is 0x0000, protocol label is 0x0006, (PDU part refers to Definition of Data Format in the Network Access Process of a Metropolitan Area Network"), and service parameter is SERVICE_TYPE_TELEPHONE_REQUEST or SERVICE_TYPE_TELEPHONE_DIRECT.

S8) MSS-400-1 receives a service request packet from MSS-1000, it determines that a request for visual communication is received according to the content of the packet; and it checks the CAM table (content-address mapping table) according to the called party number and knows that the called party is STB_1 (it is hypothesized that there is 80 Mbit/s remaining in the uplink and downlink bandwidth of STB_1 and MSS-400-1), and it checks the uplink and downlink bandwidth of STB_1 and MSS-400-1, if they meet the service requirement, it continues to jump to S10; otherwise, it jumps to S9.

S9) MSS-1000 receives the service reject packet, it jumps to S6.

S10) MSS-400-1 sends a menu to the called party, and waits the called party to response;

packet sent to STB_1: wherein DA is 0x8000 0x0000 0x0003 0x0012, SA is 0x0000 0x0000 0x0003 0x0000, reserved is 0x0000, and PDU part refers to the part of Menu Data Format in the specification.

S11) After STB_1 receives the menu, it issues a request SERVICE_TYPE_PERMISSION and accepts the communication, wherein DA is 0x0800 0x0000 0x0003 0x0000, SA is 0x0000 0x0000 0x0003 0x0012, reserved is 0x0000, (PDU part refers to Definition of Data Format in the Network Access Process of a Metropolitan Area Network), and service parameter is SERVICE_TYPE_PERMISSION.

S12) MSS-400-1 receives the response packet from STB_1, and sends a service admission packet to MSS-1000, wherein DA is 0x9000 0x0000 0x0000 0x0000, SA is 0x0000 0x0000 0x0003 0x0000, reserved is 0x0000, protocol label is 0x0006, and PDU part is neglected.

S13) If MSS-1000 receives a service admission packet, it allocates a unicast label (it is hypothesized that IN label and OUT label from MSS-400-0 to MSS-400-1 is 0x0000, and IN label and OUT label from MSS-400-1 to MSS-400-0 is 0x0001);

MSS-1000 sends a label allocation packet to MX-4-0, wherein DA is 0x9000 0x0000 0x0001 0x0000, SA is 0x0000 0x0000 0x0000 0x0000, reserved is 0x0000, protocol label is 0x0000, and PDU part contains IN label, OUT label and oriented port;

MSS-1000 sends a label allocation packet to MSS-400-0, wherein DA is 0x9000 0x0000 0x0002 0x0000, SA is 0x0000 0x0000 0x0000 0x0000, reserved is 0x0000, protocol label is 0x0005, and PDU part contains IN label, OUT label and oriented port, as well as a binding between DA, SA and label;

MSS-1000 sends a label allocation packet to MSS-400-1, wherein DA is 0x9000 0x0000 0x0003 0x0000, SA is 0x0000 0x0000 0x0000 0x0000, reserved is 0x0000, protocol label is 0x0006, and PDU part contains IN label, OUT label and oriented port, as well as a binding between DA, SA and label;

S14) MX-4-0 receives a label allocation packet and updates its table 6, item 0x0000: OUT label is 0x0000, orientation port is port 1; and item 0x0001: OUT label is 0x0001, orientation port is port 0.

S15) MSS-400-0 receives a label allocation packet and updates its CAM table in which DA, SA and label are bond (address-label binding table), that is, item 0x0000 of the CAM table: DA is 0x1000 0x0000 0x0003 0x0012, SA is 0x0000 0x0000 0x0002 0x0009;

It updates its table 6, item 0x0000: OUT label is 0x0000, orientation port is port 10;

MSS-400-0 configures its own table 2 as follows:
"10 0000 0000 0000 1001"=>"000 0000 0001", i.e., a unicast data packet with a destination address (DA) of 0x1000 0x0000 0x0002 0x0009 is oriented to port 0;

A coding/decoding command packet is sent to STB-0:
wherein, DA is 0x8000 0x0000 0x0002 0x0009, SA is 0x0000 0x0000 0x0002 0x0000, reserved is 0x0000, PDU part refers to the coding/decoding command.

| | | 8704 | |
|---|---|---|---|
| Field Number | Length | Code | Description |
| 0 | 1W | 8704 | coding/decoding command (server →user) |
| 1 | 1W | | padded |
| 2-4 | 3W | | padded |
| 5-7 | 3W | | padded |
| 8 | 1W | | padded |
| 9-11 | 3W | | padded |
| 12 | 1W | | padded |
| 13 | 1W | | 0x3217 |
| 14 | 1W | | 0x3217 |
| 15-18 | 4W | | 0x1000 0x0000 0x0000 0x0012 |
| 19-22 | 4W | | 0x1000 0x0000 0x0000 0x0009 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

S16) MSS-400-1 receives a label allocation packet and updates its CAM table in which DA, SA and label are bond, i.e., item 0x0001 of the CAM table: DA is 0x1000 0x0000 0x0002 0x0009, SA is 0x0000 0x0000 0x0003 0x0012;

It updates its table 6, item 0x0001: OUT label is 0x0001, orientation port is port 10;

MSS-400-1 configures its own table 2 as follows:
"10 0000 0000 0001 0010"=>"000 0000 0010", i.e., a unicast data packet with a destination address (DA) of 0x1000 0x0000 0x0003 0x0012 is oriented to port 1;

A coding/decoding command packet is sent to STB-1:
wherein, DA is 0x8000 0x0000 0x0003 0x0012, SA is 0x0000 0x0000 0x0003 0x0000, reserved is 0x0000, PDU part refers to the coding/decoding command.

| | | 8704 | |
|---|---|---|---|
| Field Number | Length | Code | Description |
| 0 | 1W | 8704 | coding/decoding command (server →user) |
| 1 | 1W | | padded |
| 2-4 | 3W | | padded |
| 5-7 | 3W | | padded |
| 8 | 1W | | padded |
| 9-11 | 3W | | padded |
| 12 | 1W | | padded |
| 13 | 1W | | 0x3217 |
| 14 | 1W | | 0x3217 |
| 15-18 | 4W | | 0x1000 0x0000 0x0000 0x0012 |
| 19-22 | 4W | | 0x1000 0x0000 0x0000 0x0009 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

According to table 0, the subsequent coding/decoding command packets will be respectively oriented to STB-0 and STB-1. STB-0 and STB-1 start coding/decoding according to the content of the packet, and receive and send unicast data.

3.2.3.2 Service Communication Process

1) In the packet sent by STB-0 to STB-1, DA is 0x1000 0x0000 0x0003 0x0012, SA is 0x0000 0x0000 0x0002 0x0009;

2) The packet enters MSS-400-0, and the switching engine of MSS-400-0 checks the metropolitan area network address of DA, if it does not belong to the local access network, it checks the CAM table in which DA, SA and label are bond and obtains unicast label 0x0000, then it checks item 0x0000 of table 6 and obtains OUT label 0x0000, and the orientation port is port 10, label 0x0000 is added to the sending end of port 10, i.e., header of the packet is 0x1000 0x0000 0x0003 0x0012 0x0000 0x0000 0x0002 0x0009 0x0000 0x0000 0x0000;

3) The packet enters MX-4-0, and the switching engine of MX-4-0 looks up in table 6 according to a combined address field, i.e., the table address is "110 0000 0000 0000 0000", and according to the configuration of table 6 on MX-4-0, a unicast label packet with a unicast label of 0x0000 is oriented to port 1, and the OUT label is 0x0000, i.e., header of the packet is 0x1000 0x0000 0x0003 0x0012 0x0000 0x0000 0x0002 0x0009 0x0000 0x0000 0x0000;

4) The packet enters a receiving module of port 10 on MSS-400-1, then the label is removed and the packet enters an switching engine; the switching engine of MSS-400-1 looks up in table 2 according to a combined address field, i.e., the table address is "10 0000 0000 0001 0010", and according to the configuration of table 2 on MSS-400-1, it knows that the output of the item is "00 0000 0010" which represents that downlink port 1 is opened, thus the packet enters STB-1;

5) Similarly, in the packet sent by STB-1 to STB-0, DA is 0x1000 0x0000 0x0002 0x0009, SA is 0x0000 0x0000 0x0003 0x0012;

6) The packet enters MSS-400-1, and the switching engine of MSS-400-1 checks the metropolitan area network address of DA, if it does not belong to the local access network, it checks the CAM table in which DA, SA and label are bond and obtains unicast label 0x0001, then it checks item 0x0001 of table 6 and obtains OUT label 0x0001, and the orientation port is port 10, label 0x0001 is added to the sending end of port 10, i.e., header of the packet is 0x1000 0x0000 0x0002 0x0009 0x0000 0x0000 0x0003 0x0012 0x0000 0x0000 0x0001;

7) The packet enters MX-4-0, and the switching engine of MX-4-0 looks up in table 6 according to a combined address field, i.e., the table address is "110 0000 0000 0000 0001", and according to the configuration of table 6 on MX-4-0, a unicast label packet with a unicast label of 0x0001 is oriented to port 0, and the OUT label is 0x0001, i.e., header of the packet is 0x1000 0x0000 0x0002 0x0009 0x0000 0x0000 0x0003 0x0012 0x0000 0x0000 0x0001;

8) The packet enters the receiving module of port 10 on MSS-400-0, then the label is removed and the packet enters an switching engine; the switching engine of MSS-400-0 looks up in table 2 according to a combined address field, i.e., the table address is "10 0000 0000 0000 1001", and according to the configuration of table 2 on MSS-400-0, it knows that the output of the item is "00 0000 0001", which represents that downlink port 0 is opened, thus the packet enters STB-0.

3.2.4 The Definition of Data Format During the Network Access Process of a Metropolitan Area Network:

The information interaction mode between the user terminal and the server is PDU, and both use Raw Socket to transfer PDU, the data format of which is as follows:

| Destination Address | Source Address | Destination Subaddress | Source Subaddress | PDU |
|---|---|---|---|---|
| 4W | 4W | 1BYTE | 1BYTE | 32W or 528W |

Definition of System Message (PDU)

Port Query Instruction: a 32W Short Signaling Issued by a Server

| Field Number | Length | Code | Description |
|---|---|---|---|
| 0 | 1W | 9A01 | metropolitan area server port query instruction |
| 1-4 | 4W | | network address of a server itself |
| 5 | 1W | | server type (for example, metropolitan area server MX-4) |
| 6-8 | 3W | | system clock |
| 9-31 | 23W | 0000 | padded with 0 |

Port Query Response Instruction: a 32W Short Signaling:

A response sent by a node switch and a node server to a server after reception of 9A01

| Field Number | Length | Code | Description |
|---|---|---|---|
| 0 | 1W | 9A02 | switch port query response instruction |
| 1 | 1W | | device type |
| 2-4 | 3W | | device identification (different for each switch) |
| 5 | 1W | | indicating the number of switch port that receives a query packet |
| 6-8 | 3W | 0000 | version information (inherent to a switch) |
| 9-31 | 23W | 0000 | padded with 0 |

Device Identification: With a Temporary Value of 0x5131 0201 000X (X=0–f)

Network Access Instruction: a 32W Short Signaling Issued by a Server

| Field Number | Length | Code | Description |
|---|---|---|---|
| 0 | 1W | 9A11 | metropolitan area server network access instruction |
| 1 | 1W | | device type |
| 2-4 | 3W | | device identification |
| 5-8 | 4W | | network address |
| 9-31 | 23W | 0000 | padded with 0 |

Network Access Confirmation Instruction: a 32W Short Signaling

| Field Number | Length | Code | Description |
|---|---|---|---|
| 0 | 1W | 9A12 | Network Access Confirmation Instruction |
| 1 | 1W | | device type |
| 2-4 | 3W | | device identification |
| 5-8 | 4W | | network address |
| 9 | 1W | | indicating the number of switch port that receives a network access command |
| 10-31 | 22W | 0000 | padded with 0 |

State Query Instruction: a 32W Short Signaling Issued by a Server

| Field Number | Length | Code | Description |
|---|---|---|---|
| 0 | 1W | 8A21 | switch state query instruction |
| 1 | 1W | | device type |
| 2-4 | 3W | | device identification |
| 5-8 | 4W | | network address |
| 9-11 | 3W | | real-time clock (maintained by a server) |
| 12-31 | 20W | 0000 | padded with 0 |

State Query Response Instruction: a 32W Short Signaling

| Field Number | Length | Code | Description |
|---|---|---|---|
| 0 | 1W | 8A22 | switch state query response instruction |
| 1 | 1W | | device type |
| 2-4 | 3W | | device identification |
| 5-8 | 4W | | network address |
| 9 | 1W | | indicating the number of switch port that receives a state query packet |
| 10 | 1W | | temperature |
| 11 | 1W | | switch working state |
| 12-31 | 20W | 0000 | padded with 0 |

However, the above mode in which a node server accesses a metropolitan area network is only one preferred embodiment of the invention. In a specific implementation, the node server may access the network by employing any prior art; for example, the node server may access the metropolitan area network in the mode of an IP node; that is, the metropolitan area network has an IP network structure. One skilled in the art may employ any mode in accord with the actual situation, which will not be limited in the invention.

Of course, the node server may independently control a local area network. At this point, the node server does not need to access the network; instead, it only requires an access switch and a terminal under the node server to access the local area network under the main control of the node server.

III. The Advantages of the Embodiments of the Invention Will be Further Described Below by Comparing with IP Internet.

1) Impersonation May be Prevented Fundamentally on Network Address Structure.

A user device informs the network of its IP Internet address; but in the invention, the network informs the user device of the novel network address.

To prevent others from intruding, the PC and Internet set a complex password and secret code barrier. Even for a real-name address, it still cannot be avoided that the secret code is deciphered or the security information of the user leaks out due to user's inadvertency. A PC terminal connected to the IP Internet must give a self-introduction first and inform the network of its IP address. However, who can guarantee that the IP address is true? This will be the first loophole of IP Internet that cannot be overcome.

In the novel network of the invention, the address of a terminal is learnt via network access protocol, and the user terminal can only access the novel network of the invention via this address that is learnt. Therefore, accuracy can be ensured without authentication. The novel network of the invention creates a "colored" address system with an ordered structure (D/SCAF). The novel network address of the invention not only has uniqueness, but also has a function of being locatable and characterizable; for example, similar to ID card number, it implies the geographic position of user port, device attribute, service right and other characteristics. A switch on the novel network of the invention specifies a rule of conduct for the packets according to these characteristics, thus data distribution with different attribute may be realized.

2) An Independent Passport is Issued for Each Service, so that the Path for Hacker Attack and Virus Diffusion can be Blocked.

A user can enter and exit the IP Internet freely, and a user prepares a firewall by himself/herself; but in the novel network of the invention, a passport must be requested for each service. The premise that a node server can issue an independent passport to each service is that the node server well knows the address of each service terminal and the route topology of the data packets of each service.

On the IP network, because a communication protocol is executed on a user terminal, it may be tampered. Route information is broadcast on the network, so it may be intercepted. Various intrinsic defects of IP network, for example, address spoofing, anonymous attack, mail bomb, teardrop, hidden monitoring, port scanning, internal intruding and information altering, etc., provide a stage for hackers. It is difficult to prevent Internet pollutions, such as junk mail, etc.

Because a user on the IP Internet may set any IP address to personate another user, a probe may be sent to any device on the network to snoop the information thereof, and any interference packet may be sent to the network (foul water casting). Therefore, various firewalls are invented. However, the installation of a firewall is voluntary, and the effect of a firewall is temporary and relative, because the IP Internet itself will never be clean. This is the second security defect of IP Internet that cannot be overcome.

In the novel network of the invention, after a user accesses the network, the network switch only allows the user to issue limited service requests to a node server (bacause the address of each access network device is allocated by the node server), and all other packets will be shut down. If the node server authorizes the user request, it issues a network passport to the switch on which the user exists, and if a packet issued by the user terminal does not meet the authentication condition on the network switch end, it will be discarded, thus hacker attack can be avoided. Each time a service ends, the passport will be cancelled automatically. The passport mechanism is executed by the switch, which is outside the control range of a user.

Authentication of user packet source address: it can prevent a user from sending any imitated or anonymous packet (which is automatically set after network access).

Authentication of destination address: a user can only send a packet to an object designated by the server (which is determined during service request).

Authentication of data traffic: data traffic sent by a user must meet a specification of the server (which is determined during service request).

Authentication of copyright identification: it prevents a user from forwarding a content with a copyright that is downloaded from the network (which is set by a content provider).

Passive measures such as firewall, antivirus, encryption and isolation between internet and intranet, etc., will not be needed on the novel network of the invention, and the novel network of the invention blocks the approach of hacker attack and virus diffusion on the network structure. Therefore, it may be secure network essentially.

3) Network Device and User Data are Completely Isolated, Thus the Lifeline of Virus and Trojan Can be Cut Off.

An IP Internet device may dismantle a user packet freely; but the novel network device of the invention is completely isolated from the user data. That is, during data transmission, a novel network device (for example, switch and gateway, etc.) dose not dismantle user packet; instead, it looks up in a mapping table according to the packet address, and then forwards it from the corresponding port. That is, the switch of the invention does not have the function of route calculation and selection.

The computer created by Von Neumann put program instructions and operating data in the same place, that is, a segment of program may modify other programs and data in the machine. Such a computer mode still in use today gives an opportunity to Trojan, worm, virus and backdoor, etc. With the rapid accumulation of virus, the antivirus software and patch always lag behind, so they will be in a passive state.

The technical core of Internet TCP/IP protocol is Best Efforts, Store & Forward and Error Detection & Retransmission. To complete the mission of Internet, the network server and router must have the ability of user packet resolution, which leaves a way to hacker and virus. Thus, network security becomes an Indian wrestling in which the smarter one will win for the moment. This is the third defect of IP Internet that is inherited.

On the novel network of the invention, it is impossible for the CPUs of all servers and switch devices to touch the user packet of any user. That is, the whole novel network of the invention only establishes a transparent pipeline with specified traffic and behaviors, which is completely isolated, between the terminal devices of the service-providing party and the service-receiving party. Whatever are received or sent by a user terminal, it has nothing to do with the network. The lifeline of virus and Trojan is cut off on the structure. Therefore, an end may be put to the possibility of stealing user data on the network; by the same token, those who attempts to be a hacker or make a virus will have no object to attack.

4) Free Connection Between Users are Completely Isolated, so that Effective Management May be Ensured.

IP Internet is a free market and has no middleman; the novel network of the invention is a department store and has middlemen. For the network, consumers and content providers both belong to the category of network users, except for different scales. IP Internet is a free market that will not be managed, and communication may be conducted directly between any users (P2P). That is, it is determined by users whether management is needed, it is determined by unilateral large users (providers) whether it is charged, and it is determined by unilateral large users (vampire websites) whether laws and regulations are to be complied with. The operator can at most collect an entrance fee, and it will be Arabian Nights that the operator conducts legal, moral, security or commercial rules, neither now nor in the future. This is the fourth disability of IP Internet on structure.

In the novel network of the invention, it creates a concept of service node, and it forms a department store commercial mode that is managed. Free contact is impossible between users or between consumers and providers, and all contacts must be authorized by a node server (middleman), which is a necessary condition to realize the effective management of network services. If one wants to be a novel network user, he/she must negotiate a role with the network operator; for example, from ordinary consumer to network store, school, hospital, government department, or even TV station, they are all clients of the operator, just as that the above are all clients of the telephone company. It seems that each role on the network just receives and sends a video content, however, for the receiving and sending of the video content, it must strictly comply with certain behavior rules that are negotiated. Only with specifications that must be complied with, can the relation between various users become C2C, B2C, B2B and so on in a true sense, or called managed user-to-user communication (MP2P).

The premise that a node server (middleman) can provide a service is that the node server well knows the address of each service terminal and the route topology of the data packets of each service.

5) Commercial Rules are Implanted into the Communication Protocol to Ensure a Profit-Gaining Mode;

IP Internet follows a mode of communication first; while the novel network of the invention follows a mode of management first.

For IP Internet, illegal media contents can only be sequestrated partially after a serious affect is caused, but it cannot be prevented in advance. "Professional attacks" that are systematically organized and planned cannot be prevented by law and morality; moreover, one can only be punished by law after others are harmed. The IP Internet defines management as an additional service, which is established on the application layer. Therefore, it is certain that management becomes an ornament which may exist or not. This is the fifth nature of IP Internet that cannot be changed.

In the novel network of the invention, a user terminal can only select to apply one of the services designated by the node server. The protocol signaling during the service establishing process is executed by the node server (without being processed by the user). The user terminal only answers the questions of the server passively, and accepts or rejects the service, and it cannot participate in the protocol process. Once the user accepts the service provided by the server, it will only be able to send a packet according to the mode specified by the passport, and any packet departing from the passport will be discarded in a bottom-layer switch. The basic concept of the novel network protocol according to the invention is to realize a commercial mode with a core of service content, rather than performing simple data communication. In such a mode, security will be an intrinsic attribute of the novel network, rather than being an additional service appended to the network. Of course, service right authentication, resource confirmation and charging procedure, etc., all may be easily contained in the arrangement contract.

For the device embodiments of the invention about a system for an access network device to access a network, a node server and an access switch, they basically correspond to the above method embodiments, and reference may be made to the related description of the above method embodiments, so it will not be described again here.

It should be noted that, in this specification, relation terms such as first, second and so on are only used to distinguish one entity or operation from another entity or operation, rather than requiring or implying that such an actual relation or sequence exists between these entities or operations.

A method for an access network device to access a network, a node server and an access switch according to the invention have been described in detail above. Theories and embodiments of the invention are illustrated with specific examples, and the description of the above embodiments only aims to help one skilled in the art to understand the method of the invention and its core concept; at the same time, various modifications and variations may be made by those skilled in the art without departing from the scope of the invention. In conclusion, the contents of the specification should not be construed as limiting the scope of the invention.

The invention claimed is:

1. A method for an access network device to access a network, comprising:

powering on an access switch, and setting, in a downlink protocol packet address table within the access switch, that all downlink protocol packets are to be oriented to a CPU module;

receiving, by the access switch, a downlink protocol packet sent from a node server and orienting the downlink protocol packet to the CPU module of the access switch according to the settings of the downlink protocol packet address table; and generating, by the CPU module, an uplink protocol packet and sending the uplink protocol packet to the node server; wherein the downlink protocol packet contains an access network address that is to be allocated;

sending, by the node server, a network access command to the access switch, wherein the network access command contains an access network address of the access switch, and the access network address of the access switch is the access network address to be allocated in the downlink protocol packet received by the access switch; and updating, by the access switch, the downlink protocol packet address table within the access switch, as orienting, to the CPU module, only a protocol packet with a destination address being the access network address of the access switch;

wherein, an address information table is further set inside the node server, in which address occupation information, device identification information and device resource information are recorded, the method further comprising:

initializing the address information table when the node server is powered on, wherein the initializing comprises:

filling the access network address of the node server in a blank item of the address information table, and marking the address occupation information as used;

filling the device identification information as current node server; and filling the device resource information as port information of the current node server, the method further comprising:

updating the address information table according to setting of a downlink port to which each downlink protocol packet is to be oriented in a downlink protocol packet address table within the node server, wherein the updating comprises:

filling an access network address, to be allocated, contained in each downlink protocol packet respectively into a blank item of the address information table, and marking the address occupation information as standby, the method further comprising:

updating the address information table according to setting of a downlink port of other access devices to which a port downlink protocol packet is to be oriented, wherein the updating comprises:

filling an access network address, to be allocated, contained in each port downlink protocol packet respectively into a blank item of the address information table, and marking the address occupation information as standby, the method further comprising:

updating the address information table when the node server receives a network access command response sent by the access switch, wherein the updating comprises:

marking the address occupation information in an item corresponding to the access network address of the access switch as used;

updating the device identification information as current access switch; and updating the device resource information as the port information of the current access switch and an access network address information of an access network device connected to a port of the current access switch, the method further comprising:

updating the address information table when the node server receives a network access command response sent by a terminal, wherein the updating comprises:

marking the address occupation information in an item corresponding to the access network address of the terminal as used;

updating the device identification information as current terminal; and updating the device resource information as the port information of the current terminal and an access network address information of an access network device connected to a port of the current terminal.

2. The method of claim 1, wherein, when the access switch has accessed the network and receives a port allocation packet sent by the node server, the method further comprises:

orienting, by the access switch that has accessed the network, the port allocation packet with a destination address being an access network address of the access switch, to the CPU module; and setting, according to port allocation information in the port allocation packet, a downlink port to which each port downlink protocol packet is to be oriented, in the downlink protocol packet address table within the access switch.

3. The method of claim 2, wherein, when the access switch has accessed the network and receives port downlink protocol packet sent by the node server, the method further comprises:

orienting, by the access switch, the port downlink protocol packet to the downlink port according to the setting of the downlink protocol packet address table within the access switch, wherein the port downlink protocol packet contains an access network address that is to be allocated; and sending, by the node server, a network access command to a subordinate network device that is connected to the downlink port of the access switch, when the node server receives a port uplink protocol packet sent from said subordinate network device, wherein the network access command contains an access network address of the subordinate network device, and the access network address of the subordinate network device is the access network address to be allocated in the port downlink protocol packet received by the subordinate network device.

4. The method of claim 3, wherein, the subordinate access network device comprises an access switch or a terminal, wherein, when the subordinate access network device is an access switch, the method further comprises:

updating, by the subordinate access network device, the downlink protocol packet address table within the subordinate access network device according to the network access command, for setting that a protocol packet with a destination address being the access network address of the subordinate access network device is to be oriented to the CPU module.

5. The method of claim 1, wherein, when the access switch has accessed the network and receives a state downlink protocol packet sent by the node server periodically, the method further comprises:

orienting, by the access switch that has accessed the network, the state downlink protocol packet with a destination address being an access network address of the access switch, to the CPU module according to setting of the downlink protocol packet address table within the access switch; and generating, by the CPU module, a state uplink protocol packet, and sending the state uplink protocol packet to the node server, wherein, when the access switch has accessed the network and receives a state downlink protocol packet sent by the node server periodically, the method further comprises:

orienting, by the access switch that has accessed the network, a state downlink protocol packet with a destination address being an access network address of a subordinate access network device, to a port according to setting of the downlink protocol packet address table within the access switch, and transferring the state downlink protocol packet to the subordinate access network device via the port; and generating, by the subordinate access network device, a state uplink protocol packet for the state downlink protocol packet received, and sending the state uplink protocol packet to the node server.

6. The method of claim 1, wherein, an uplink protocol packet address table is further set inside the access switch, and the method further comprises:

when the access switch being powered on, setting, in the uplink protocol packet address table within the access switch, an uplink port to which all uplink protocol packets are to be oriented, wherein, a data packet address table is further set inside the access switch, and the method further comprises:

when the access switch being powered on, setting in the data packet address table within the access switch that orientation of all data packets is closed.

7. The method of claim 1, further comprising:

powering on the node server, importing a registration information of a subordinate access network device to the CPU module, obtaining a metropolitan area network address, and configuring an access network address of the node server, the method further comprising:

accessing, by the node server, a metropolitan area network, wherein the metropolitan area network is a network with a centralized control function, which comprises a metropolitan area server, a node switch and a node server, wherein the node switch is connected between the metropolitan area server and the node server; and step of accessing, by the node server, the metropolitan area network comprises:

accessing, by a metropolitan area network device, the metropolitan area network, and allocating, by the metropolitan area server with a centralized control function in the metropolitan area network, a protocol label and a metropolitan area network address to the metropolitan area network device that accesses the metropolitan area network;

wherein, the metropolitan area network device comprises a node switch and a node server, the protocol label is configured to describe a connection between the metropolitan area network device and the metropolitan area server; when there exist a plurality of connections between one same metropolitan area network device and the metropolitan area server, the metropolitan area server allocates a different protocol label to each connection; and allocating, by the metropolitan area server, a data label to each service requested across the metropolitan area network, wherein the data label is configured to describe a connection between node servers related to the service.

8. The method of claim 2, further comprising:
setting, by the node server in a downlink protocol packet address table within the node server, a downlink port to which each downlink protocol packet is to be oriented respectively; and
sending, by the node server, a downlink protocol packet via a corresponding downlink port according to setting of the downlink protocol packet address table,
the method further comprising:
generating, by the node server, the port allocation packet containing port allocation information; and
sending, by the node server, the port allocation packet via a corresponding downlink port according to setting of a downlink protocol packet address table within the node server.

9. The method of claim 1, wherein, an uplink protocol packet address table is further set inside the node server, and the method further comprises:
when the node server being powered on, setting in the uplink protocol packet address table within the node server that all uplink protocol packets are to be oriented to the CPU module,
wherein, a data packet address table is further set inside the node server, and the method further comprises:
when the node server being powered on, setting in the data packet address table within the node server that orientation of all data packets is closed,
the method further comprising:
determining, by the CPU module of the node server according to a network access command response packet, whether registration information of the access switch exists, if yes, determining that the access switch is valid; otherwise, determining that the access switch is invalid; and
sending a network access command if the access switch is valid,
the method further comprising:
determining, by the CPU module of the node server according to a network access command response packet, whether registration information of the access network device exists, if yes, it is determined that the access network device is valid; otherwise, it is determined that the access network device is invalid; and
sending a network access command if the access switch is valid.

10. A node server, comprising:
a downlink protocol packet sending module, for sending a downlink protocol packet to an access switch, wherein the downlink protocol packet contains an access network address that is to be allocated;
an uplink protocol packet receiving module, for receiving an uplink protocol packet returned by the access switch for the downlink protocol packet; and
a first network access command sending module, for sending a network access command to the access switch according to the uplink protocol packet received, wherein the network access command contains an access network address allocated to the access switch, and the access network address is the access network address to be allocated in the downlink protocol packet received by the access switch;
the node server further comprising:
an initializing module, for importing registration information of a subordinate access network device to CPU, obtaining a metropolitan area network address and configuring access network address of the node server after being powered on,
the node server further comprising:
a protocol label and address acquiring module, for obtaining a protocol label and a metropolitan area network address allocated from a metropolitan area server after accessing a metropolitan area network, wherein the protocol label is configured to describe a connection between the node server and the metropolitan area server; when a plurality of connections exist between one same node server and a superior connection device, the protocol label and address acquiring module obtains a different protocol label corresponding to each connection, wherein the superior connection device includes a node switch and a metropolitan area server; the metropolitan area network is a network with a centralized control function, which comprises a metropolitan area server, a node switch and a node server, wherein the node switch is connected between the metropolitan area server and the node server;
a data label acquiring module, for obtaining a data label allocated corresponding to a service from the metropolitan area server for each service request across the metropolitan area network, wherein the data label is configured to describe a connection between node servers related to the service;
a label adding module, for adding a corresponding protocol label or data label to a protocol packet or data packet sent by the node server to the metropolitan area network; and
a label deleting module, for removing the corresponding protocol label or data label from the protocol packet or data packet received from the metropolitan area network,
wherein, the label is divided into an IN label and an OUT label, wherein the IN label refers to a label by which a packet enters a metropolitan area server or a node switch, the OUT label refers to a label by which the packet leaves the metropolitan area server or the node switch;
the IN label and OUT label of one same data packet are different, or same; and
a label packet includes a protocol label and a data label,
the node server further comprising:
an address-label mapping table, for recording, for each service across the metropolitan area network, a binding relation between the access network address and the OUT label of two terminals across the metropolitan area network;
wherein, the access network address is an address allocated by each node server to a network access device connected under the node server, then, the label adding module looks up, according to the address-label mapping table, an OUT label corresponding to a protocol packet or data packet that is sent by the node server to the metropolitan area network, and adds the OUT label that is found and sends the protocol packet or data packet.

11. The node server of claim 10, further comprising:
a port allocation packet sending module, for sending a port allocation packet to an access switch that has accessed a network, wherein the port allocation packet contains port allocation information, and the port allocation information is information of each downlink port of the access switch to which each port downlink protocol packet is to be oriented.

12. The node server of claim 11, further comprising:
a port downlink protocol packet sending module, for sending a port downlink protocol packet to an access switch that has accessed the network, wherein the port downlink protocol packet contains an access network address that is to be allocated;
a port uplink protocol packet receiving module, for receiving a port uplink protocol packet sent by a subordinate network device that is connected to the downlink port of the access switch; and
a second network access command sending module, for sending a network access command to the subordinate access network device, wherein the network access command contains the access network address of the subordinate network device, and the access network address of the subordinate network device is the access network address to be allocated in the port downlink protocol packet received by the subordinate network device,
the node server further comprising:
a network access response receiving module, for receiving a network access command response sent by the subordinate access network device,
wherein, the subordinate access network device comprises an access switch or a terminal.

13. The node server of claim 10, further comprising:
a state downlink protocol packet sending module, for periodically sending a state downlink protocol packet to an access switch that has accessed a network; and
a first state uplink protocol packet receiving module, for receiving a state uplink protocol packet returned by the access switch for the state downlink protocol packet,
the node server further comprising:
a second state uplink protocol packet receiving module, for receiving a state uplink protocol packet returned by the subordinate access network device for the state downlink protocol packet.

14. The node server of claim 10, further comprising:
a first Table 0 setting module, for setting, in downlink protocol packet address table within the node server, a downlink port to which each downlink protocol packet is to be oriented respectively;
wherein the downlink protocol packet sending module sends a downlink protocol packet via a corresponding downlink port according to the settings of the downlink protocol packet address table,
wherein, an address information table is further set inside the node server, in which address occupation information, device identification information and device resource information are recorded,
the node server further comprises:
an address information table initializing module, for initializing an address information table when powered on, wherein the initializing comprises:
filling the access network address of the node server in a blank item of the address information table, and marking the address occupation information as used;
filling the device identification information as the current node server; and
filling the device resource information as port information of the current node server.

* * * * *